United States Patent
Yanaka

[19]

[11] Patent Number: 6,115,138
[45] Date of Patent: *Sep. 5, 2000

[54] IMAGE FORMING APPARATUS

[75] Inventor: Toshiyuki Yanaka, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/772,939

[22] Filed: Dec. 24, 1996

[30] Foreign Application Priority Data

Dec. 26, 1995 [JP] Japan .................................. 7-339608

[51] Int. Cl.$^7$ .................................................. G06F 15/00
[52] U.S. Cl. ......................... 358/1.9; 358/517; 358/518; 358/515; 358/523; 382/162
[58] Field of Search ..................................... 395/102, 105, 395/109, 112; 358/298, 444, 448, 451, 453, 462, 456, 500, 502, 503, 517, 518, 515, 523, 537, 538, 539, 1.2, 1.5, 1.9, 1.13; 382/232, 233, 162, 260

[56] References Cited

U.S. PATENT DOCUMENTS

| | | | |
|---|---|---|---|
| 4,313,124 | 1/1982 | Hara ..................................... | 346/140 R |
| 4,345,262 | 8/1982 | Shirato et al. ....................... | 346/140 R |
| 4,459,600 | 7/1984 | Sato et al. ........................... | 346/140 R |
| 4,463,359 | 7/1984 | Ayata et al. ............................. | 346/1.1 |
| 4,558,333 | 12/1985 | Sugitani et al. ..................... | 346/140 R |
| 4,608,577 | 8/1986 | Hori ..................................... | 346/140 R |
| 4,679,074 | 7/1987 | Sugiura et al. ......................... | 358/523 |
| 4,723,129 | 2/1988 | Endo et al. .............................. | 346/1.1 |
| 4,740,796 | 4/1988 | Endo et al. .............................. | 346/1.1 |
| 4,977,448 | 12/1990 | Murata et al. ........................... | 358/448 |
| 5,200,832 | 4/1993 | Taniuchi et al. ........................ | 358/448 |
| 5,343,312 | 8/1994 | Hibi et al. ............................... | 358/444 |
| 5,568,285 | 10/1996 | Ikeda ..................................... | 358/518 |
| 5,847,729 | 12/1998 | Takahashi et al. ........................ | 347/43 |

FOREIGN PATENT DOCUMENTS

| | | | |
|---|---|---|---|
| 0517544 | 12/1992 | European Pat. Off. ......... | H04N 1/40 |
| 0571926A1 | 12/1993 | European Pat. Off. ......... | H04N 1/46 |
| 3409771A1 | 9/1984 | Germany .......................... | H04N 1/46 |
| 54-56847 | 5/1979 | Japan ............................... | B41M 5/26 |
| 59-123670 | 7/1984 | Japan ................................ | B41J 3/04 |
| 59-138461 | 8/1984 | Japan ................................ | B41J 3/04 |
| 60-71260 | 4/1985 | Japan ................................ | B41J 3/04 |
| 8-116463 | 5/1996 | Japan ............................... | H04N 1/60 |

*Primary Examiner*—Edward L. Coles
*Assistant Examiner*—Mark Wallerson
*Attorney, Agent, or Firm*—Fitzpatrick, Cella, Harper & Scinto

[57] ABSTRACT

An image processor performs image processing depending upon a plurality of data types such as additive color mixing type colors or substractive color mixing type colors. Other data types may be processed such as when extra colors are used other than yellow ink, magenta ink, cyan ink and black ink, in order to enhance image quality in an ink jet recorder, or in the event an ink color is arbitrarily changed or one or more types of ink colors are increased or decreased.

23 Claims, 12 Drawing Sheets

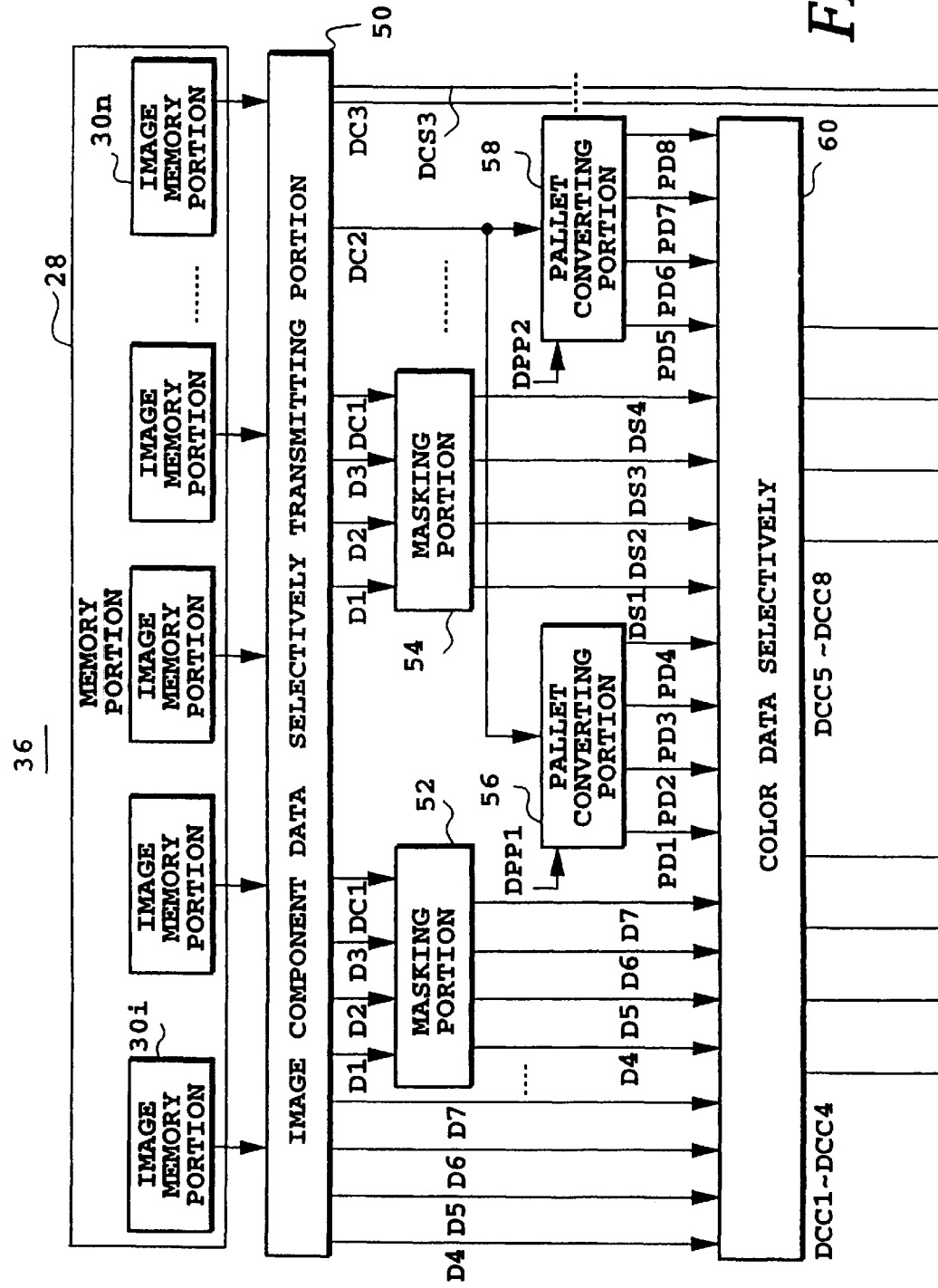

IMAGE FORMING APPARATUS

BACKGROUND OF THE INVENTION

1. Field of the Invention

The present invention relates to an image forming apparatus for printing and forming an image on a printing medium the basis of an image data stored in a memory portion.

2. Description of the Related Art

An image forming apparatus forming a color image on a printing medium on the basis of a color image data is generally constructed with an image data memory portion storing an image data representative of an image to be formed on the printing medium, a image memory control portion performing writing operation control controlling writing of an image data with respect to an image data memory portion and rearing operation control controlling reading of data stored in the image data memory portion, an image processing portion performing gray scale reproduction process and color reproduction process on the basis of the data read out from the image data memory portion and thus deriving an image signal, and a printing head drive control portion generating drive control signals for respective printing head portions arranged corresponding to respective colors of printing materials, e.g. ink colors, such as cyan (C), magenta (M), yellow (Y) and black (K) and so forth, opposing to the surface of the printing medium, on the basis of the image signal from the image processing portion and supplying the drive control signals to respective printing head portions.

In the construction set forth above, when the image data supplied from an external host computer per a predetermined band width (1 band: amount to be printed on the printing medium by one time of scan of the arranged printing head), the image data is written in the image memory portion at a predetermined timing by the image memory control portion. On the other hand, the image data written in the image memory portion is read out and supplied to the image processing portion. In the image processing portion, a gray scale conversion process for respective multi-level data of color data, e.g. red (R), green (G) and blue (B) with luminance data of the image data. In conjunction therewith, binarization process utilizing gray scale or tone production method by density of each element for pseudo gray scale expression. The drive control portion generates the drive control signals for driving the printing head for performing printing operation depending upon the binarized data for the predetermined band width from the image processing portion, and supplies the drive control signals to the printing head portions. By this, when the printing head portions are scanned on the printing medium, an image is formed on the printing medium.

As forms of the foregoing input image data, there are a color data of additive color mixing type, such as data expressing R, G, B respectively and a color data of subtractive color mixing type, such as multi-value data and binary data expressing C, M, Y, K respectively. The image processing portion in the conventional image forming apparatus is fixed to one of the data types among input data expressing R, G, B, respectively or input multi-value data or binary data expressing C, M, Y, K, respectively. However, in case of coloring for a cloth, such as in screen textile printing, special ink color is used in addition to C, M, Y, K. Also, in the image forming apparatus, such as a color printer, special color for enhancing of image quality, such as high density color and low density color of the same color type printing material for enhancing tone or gray scale expression of the image, may be used. However, conventionally, since the image processing portion can be adapted to only one data type, it has not been possible to arbitrarily change the color of the printing material or to increase or decrease number of colors.

SUMMARY OF THE INVENTION

In consideration of the inconvenience in the prior art, it is an object of the present invention to provide an image forming apparatus for printing and forming an image on a printing medium on the basis of an image data stored in a memory portion, which can be adapted to a plurality of kinds of input image data types.

In a first aspect of the present invention, there is provided an image forming apparatus comprising:

an image data memory portion storing data representative of luminance component and chrominance component of an image per image array, per luminance component and chrominance component;

an image memory control portion for making the image data memory portion to perform writing and reading operation of the data;

an image processing portion including:

a selection operation control portion for making the image memory control portion to selectively perform writing operation of the image data memory portion adapted to type of the data and reading operation of the image data memory portion depending in response to an output demand;

a data selectively transmitting portion for selectively transmitting the data depending upon data type supplied from the image data memory portion;

a masking portion performing a masking data process on the basis of an input data from the data selectively transmitting portion for obtaining a color data of different data type to that of the input data;

a pallet converting portion for obtaining the color data with reference to a color conversion data table on the basis of the data from the data selectively transmitting portion;

a color data selectively transmitting portion for selectively transmitting data representative of a color component from the data selectively transmitting portion, the color data from the masking portion and the color data from the pallet converting portion; and a binarization converting portion performing binarization process for the color data from the color data selectively transmitting portion;

an image processing operation control portion for making the data selectively transmitting portion, the masking portion, the pallet converting portion, the color data selectively transmitting portion and the binarization converting portion to operate according to an operation program; and a printing head drive control portion for generating a drive control signal for making a printing head to perform image printing operation on the basis of the obtained through binarization process from the image processing portion.

Here, the data selectively transmitting portion selectively may transmit a luminance data indicative of gray scale of respective of additive color mixing type colors, a luminance code data indicative of distribution of respective color on the basis of the luminance data, a color data indicative of respective of subtractive color mixing type colors, a color code data representative of distribution of respective colors on the basis of the color data, and a binarized data indicative of presence and absence of printing demand per each pixel data.

The masking portion may perform masking data process for luminance data representative of gray scale per each of additive color mixing type color and luminance code data representative of distribution of respective color on the basis of the luminance data.

The pallet converting portion may derive the color data with reference to a color conversion data on the basis of color code data indicative of distribution of distribution of respective color on the basis of the color data.

The data selectively transmitting portions may comprise a plurality of selectively transmitting blocks each having a plurality of gate circuit portions, to which data is input, and decoder portion performing operation control of the gate circuit portion The masking portion may include a density converting portion and a plurality of masking calculation portion performing masking calculation process on the basis of the density data from the density converting portion.

The color data selectively transmitting portion may include a plurality of color data selectively transmitting blocks having a plurality of selector portion selectively transmitting supplied color data and a decoder portion performing operation control of the selector portion.

The data from the gate circuit portion in the selectively transmitting block of the data selectively transmitting portion may be supplied to the density converting portion via the selector portion in the masking portion.

The color data from the masking calculation portion of the masking portion may be supplied to the selector portion in the color data selectively transmitting block of the color data selectively transmitting portion.

The color data from the selector portion in the color data selectively transmitting block of the color data selectively transmitting portion may be supplied to the binarization processing portion via the density correcting portion and an output gamma converting portion in the binarization converting portion.

In a second aspect of the present invention, there is provided an image forming apparatus comprising:

an image data memory portion storing data representative of luminance component and chrominance component of an image per image array, per luminance component and chrominance component;

a masking portion performing a masking data process on the basis of an input data for obtaining a color data of different data type to that of said input data;

a pallet converting portion for obtaining the color data with reference to a color conversion data table on the basis of the data;

a binarization converting portion performing binarization process for the color data; and an image processing operation control portion for making said masking portion, said pallet converting portion, and said binarization converting portion to operate depending upon the image data type.

As can be clear from the foregoing description, with the image forming apparatus according to the present invention, upon generation of the drive control signal to operate the printing head to perform image printing operation by the printing head drive control portion, data representative of luminance component or chrominance component per pixel array is stored per luminance component or chrominance component In the image data memory portion. In this condition, the data stored in the image data memory is read out by the image memory control portion and supplied to the image processing portion. Then, the drive control signals are generated on the basis of the binarized data from the image processing portion.

On the other hand, data per luminance component or chrominance component per pixel array read out from the image memory portion is selectively fed depending upon the supplied data type, to the masking portion and the pallet converting portion by the data selective transmitting portion, respectively.

By this, the color data of the different type to the input data type is obtained by the masking portion, and the color data is obtained by the pallet converting portion. Data thus obtained is supplied to the color data selectively transmitting portion together with the data supplied from the data selective transmitting portion. Each color data is selectively supplied to the binarizing converting portion by the color data selectively transmitting portion. Thus, binarized data can be obtained. Accordingly, it becomes possible to adapt to a plurality of kinds of input image data. As a result, for example, when type of the input data is varied associating with increasing or decreasing of colors of the printing materials, the binarized data adapted to respective data type can be obtained.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 3:
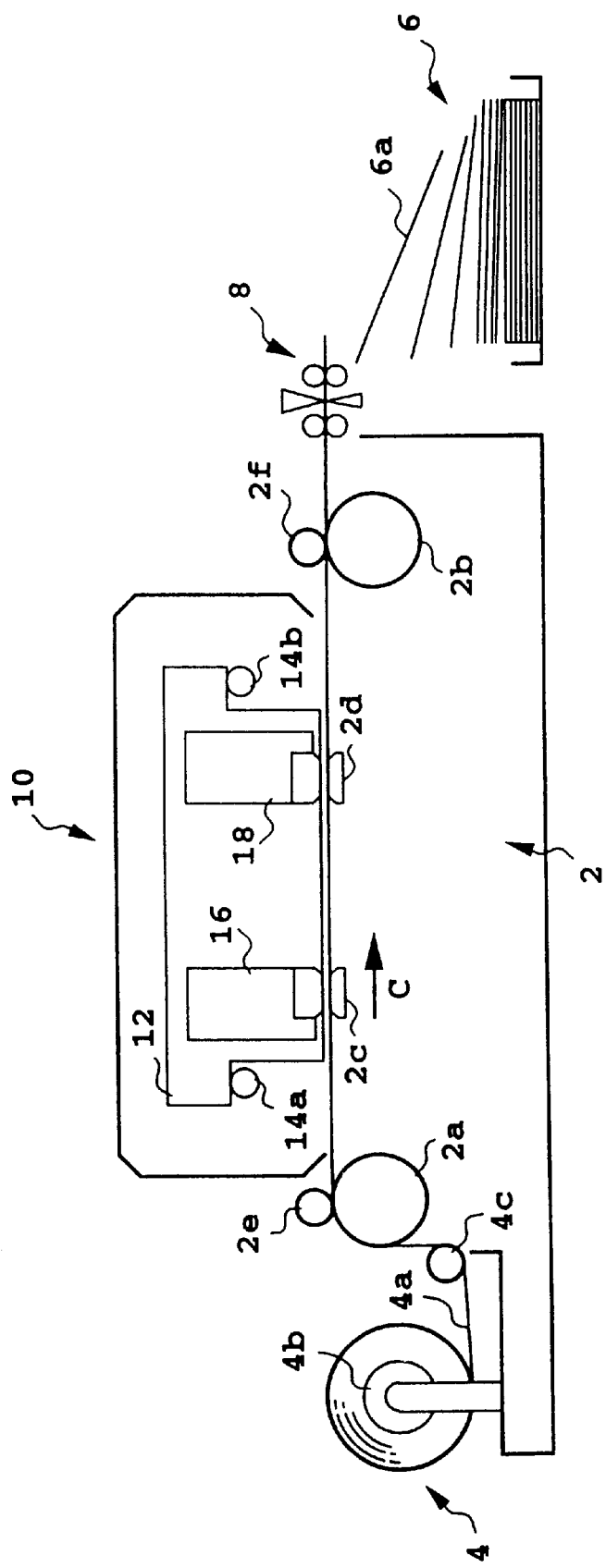
FIG. 3 is a schematic and diagrammatic illustration showing major part of one embodiment of the image forming apparatus according to the present invention.

FIG. 3 schematically and diagrammatically shows one embodiment of an image forming apparatus according to the present invention.

In the embodiment shown in FIG. 3, an image forming apparatus includes a paper feeding portion 4 which supplies a roll form paper 4a for a printing medium via a pressure roller 4c according to rotation of a feeding roller 4b, a transporting portion 2 transporting the paper 4a from the paper feeding portion 4 to a paper cutting portion 8, a head unit portion 10 arranged above the transporting portion 2 in opposition thereto for performing printing operation for the paper 4a, the paper cutting portion 8 for cutting off to predetermined length the paper transported from the transporting portion 2, and an ejected paper stacking portion 6 for stacking the paper sheet 6a cut into the predetermined length by the paper cutting portion 8.

To an upstream side end portion at the side of the paper feeding portion 4 and a downstream side end portion at the side of paper cutting portion 8 of the transporting portion 2, driving rollers 2a and 2b are provided, respectively. The driving rollers 2a and 2b are driven by a not shown transporting driving motor. The driving roller 2a is cooperated with a pressure roller 2e for transporting the paper 4a in a transporting direction shown by an arrow C. On the other hand, the driving roller 2b is cooperated with a pressure roller 2f for transporting the paper 4a in a transporting direction shown by the arrow C. Also, between the driving rollers 2a and 2b, platen members 2c and 2d are provided in opposition to respective printing head portions for slidingly contacting with the backside surface of the paper 4a for maintaining flatness of the printing portion in the paper 4a. The platen members 2c and 2d extend along arrangement of respective printing head portions.

A printing head unit portion 10 is constructed with a carriage portion 12 to be scanned in a direction (primary scanning direction) perpendicular to the transporting direction (auxiliary scanning direction) of the paper 4a, supporting members 14a and 14b arranged opposite to each other at both end portions along the transporting direction of the paper 4a in the carriage portion 12 and supporting a pair of slide rail portions guiding the carriage portion 12 along the primary scanning direction, and printing head array portions 16 and 18 held on the carriage portion 12, provided in two sets along the transporting direction of the paper 4a, and constituted of a plurality of printing head portions performing printing operation, ejecting ink as printing material for the paper 4a.

The carriage portion 12 is driven and controlled by a not shown carriage driving motor via a belt transmission mechanism. The printing head array portions 16 and 18 has the same construction. Therefore, discussion will be given hereinafter only for the printing head array portion 16 and discussion for the printing head array portion 18 is neglected. The printing head array portion 16 has eight printing heads 16a, 16b, 16c. . . 16h along a primary scanning direction, for example. Each of the printing head portions 16a, 16b, 16c. . . 16h is an ink-jet printing head portion which is a bubble-jet head portion having a heater element for generating a thermal energy for generating a film boiling in the ink as energy to be used for ejecting the ink. Respective printing head portions 16a, 16b, 16c. . . 16h have a plurality of ink ejection openings along the auxiliary scanning direction in opposition to the transported paper 4a and are supplied the ink liquid from not shown ink liquid supply portion. Respective printing head portions 16a, 16b, 16c. . . 16h are corresponded to different ink colors. As the ink colors, cyan (C), magenta (M), yellow (Y), black (K), blue (BL), orange (OR), tint cyan (CL), tint magenta (ML) are used. It should be noted that special ink colors, gold, silver and so forth, or a plurality kinds of ink colors of the same color but different density may also be used.

Figure 4:
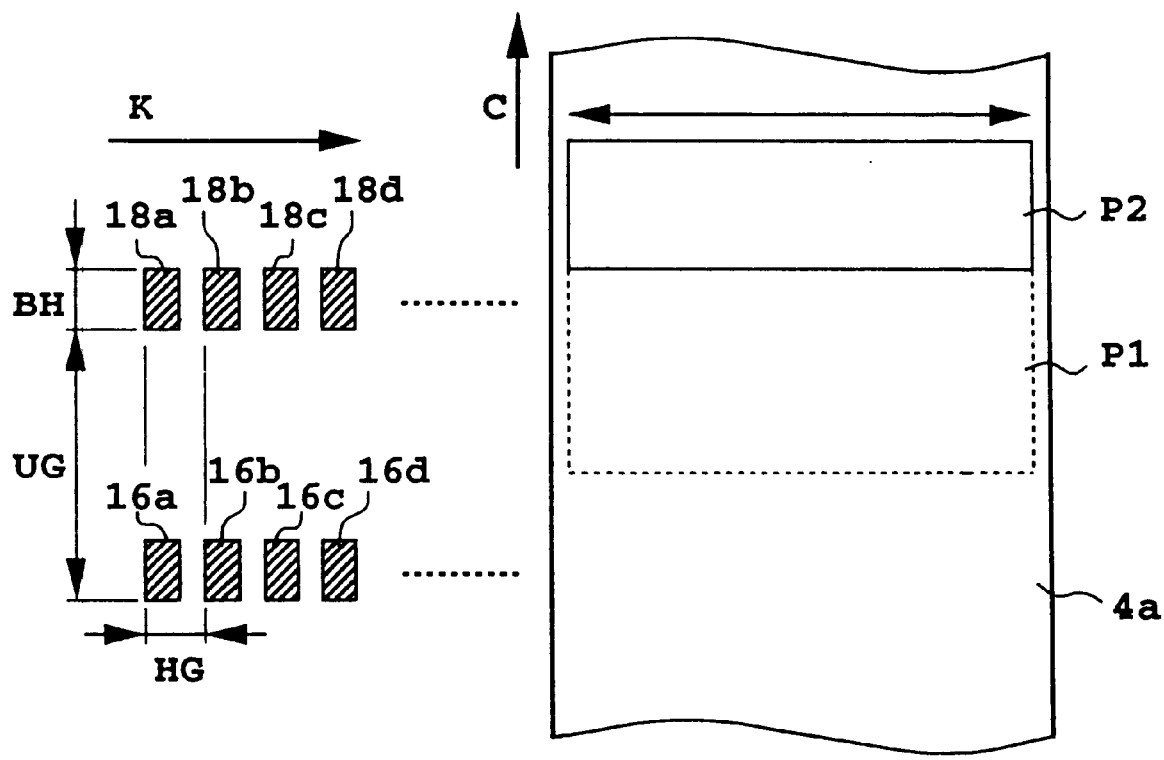
FIG. 4 is an illustration for explaining operation in one embodiment of the image forming apparatus of FIG. 3.

As shown in FIG. 4, the printing head array portions 16 and 18 are arranged the printing head positions 16a, 16b, . . . 16h and 18a, 18b, . . . 18h along the primary scanning direction shown by an arrow K perpendicular to the transporting direction (auxiliary scanning direction) of the paper 4a shown by the arrow C, with a predetermined head gap HG. A width BH in the direction of arrow C in respective printing head portions 16a, 16b, 16c, . . . 16h and 18a, 18b, 18c, . . . 18h is referred to as the socalled 1 band width. Also, the printing head array portions 16 and 18 are arranged in mutually spaced apart relationship with a predetermined gap UG [=(2n+1)·Hn/2, wherein n is an integer, Hn represents number of ink ejection openings]. The printing operation in the printing head array portion 16 is performed by shifting the carriage portion 12 above the paper 4a along the primary scanning direction while the paper 4a is temporarily stopped. By this, an image is formed in a printing region p1 shown in FIG. 4. On the other hand, the printing operation of the printing head array portion 18 is performed for a region thinned per each dot unit in the printing region P1, in the temporarily stopped condition after feeding of the paper 4a in the predetermined amount. Thus, a printed image is formed by printing operation of the printing head array portion 16 and the printing head array portion 18 in the printing region P2.

Figure 2A:
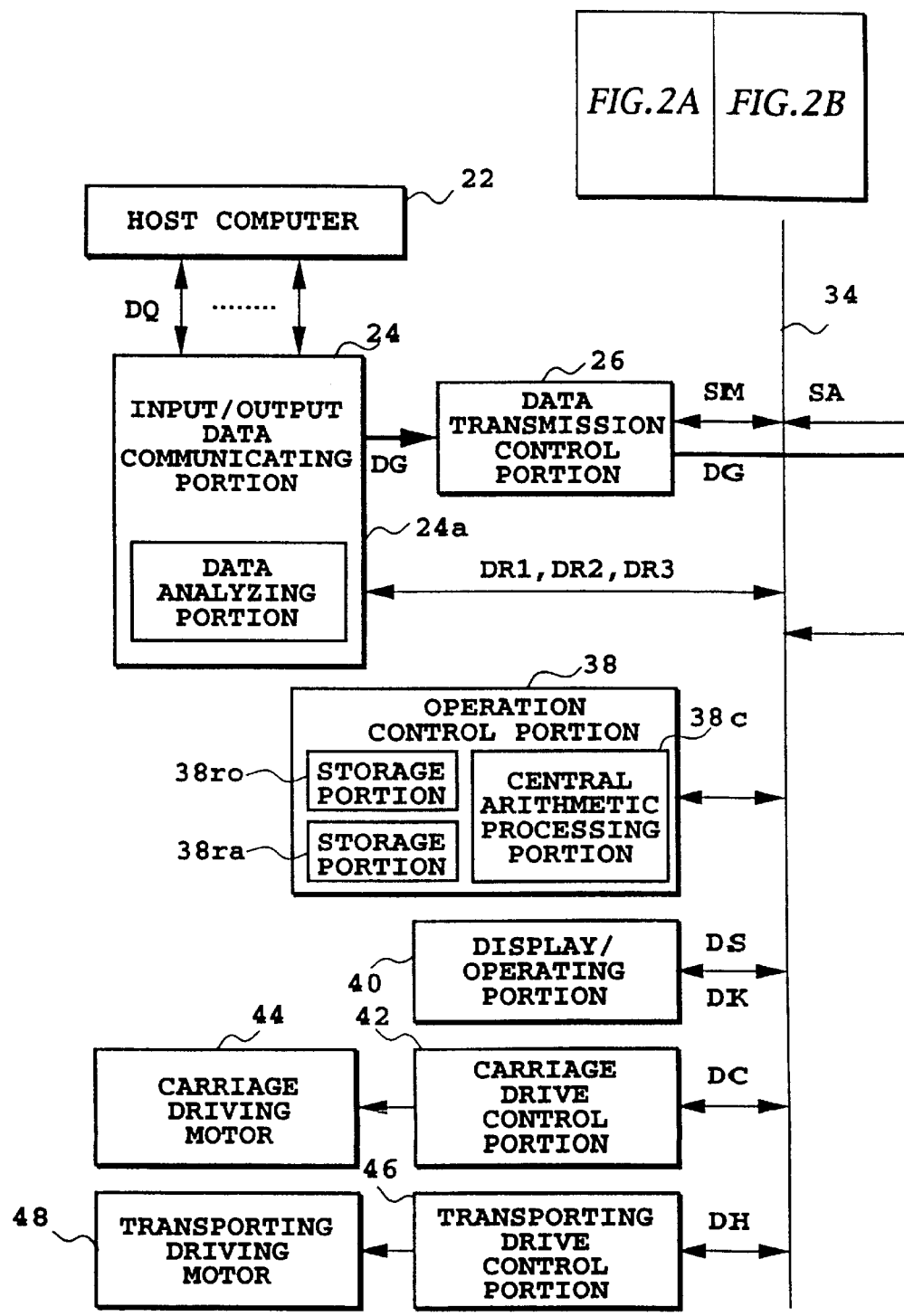
FIG. 2 is a block diagram showing a control block to be provided in one embodiment of the image forming apparatus according to the present invention.
Figure 2B:
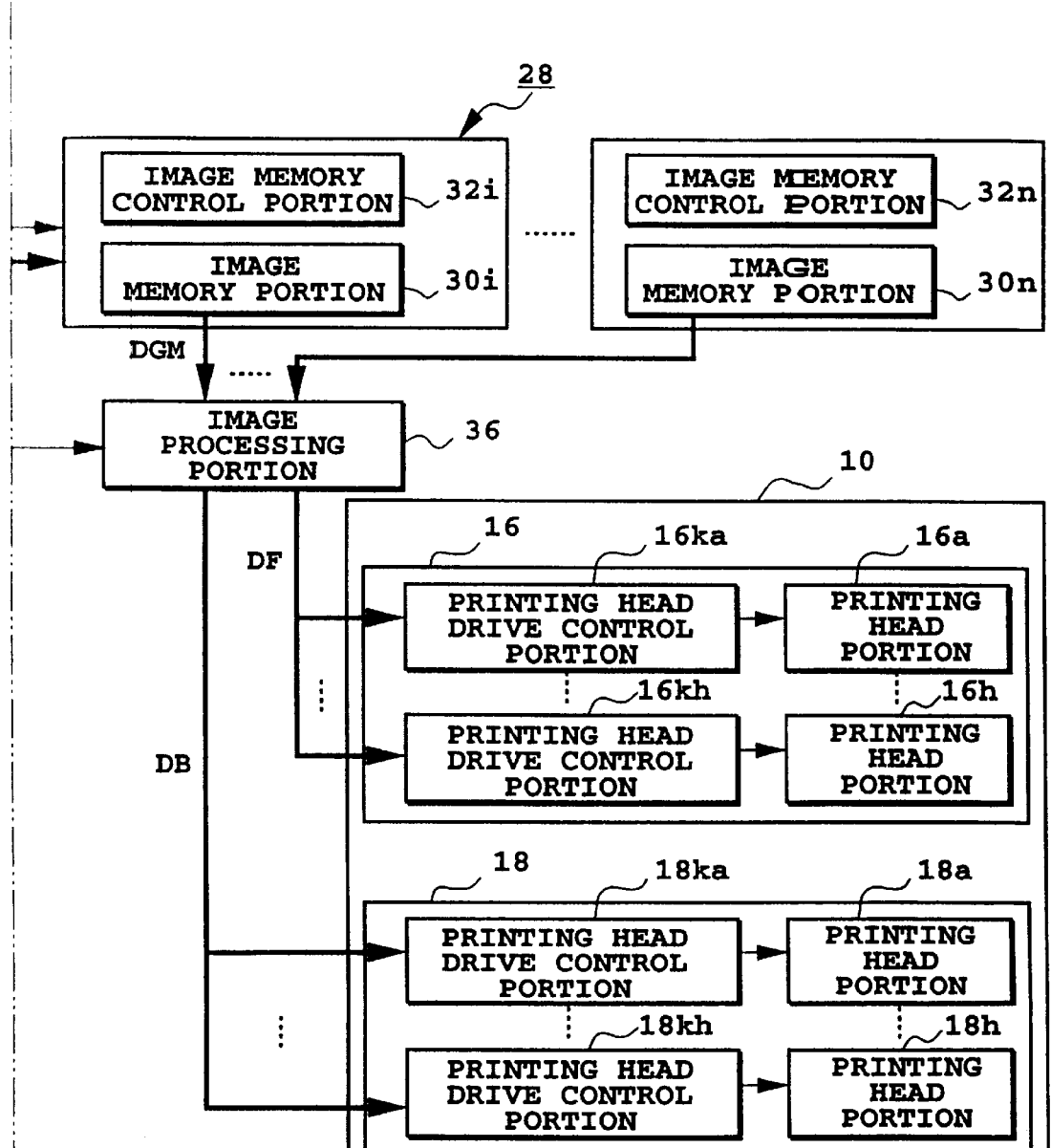

On the other hand, in one embodiment of the image forming apparatus according to the present invention, a control block portion 20 shown in FIG. 2 is additionally provided.

The control block portion 20 has an input/output data communication portion 24 supplied a data group DQ including an image data and a control data from a host computer 22 provided separately from the shown embodiment of the image forming apparatus and serving as a data supply portion, a storage portion 28 selectively storing the image data DG from the input/output data communication portion 24 and selectively feeding the stored image data, data transmission control portion 26 performing direct transmission control (DMA control) of the image data from the input/output data communication portion 24 to respective image memory portions 30a. . . 30n in the storage portion, and an image processing portion 36 performing data conversion process on the basis of image data group DGM read from the storage portion 28 at the predetermined timing for obtaining printing operation control data group DF and DB for the printing head array portions 16 and 18. In addition, the control block portion 20 includes an operation control portion 38. The operation control operation 38 performs operation control of the storage portion 28 through a data bus 34, and also performs inner connecting setting of the following image processing portion 36. The operation control portion 38 also feeds a display operation control data DS to a display/operation portion 40 on the basis of the control data obtained through a data bus 34, and also feeds control data DC and DH to a carriage drive control portion 42 for driving and controlling a carriage driving motor 44 and a transportation drive control portion 46 for driving and controlling the transporting driving motor 48.

When the data group DQ is supplied from the host computer 22, the input/output data communication portion 24 is placed in a reception state and when a signal indicative of lack of memory capacity is supplied from the operation control portion 38, the input/output data communication portion 24 is placed in a transmission state feeding the signal to the host computer 22. Supplied data group DQ may include an image component data in a plurality of data type. The image component data supplied per a predetermined number of bands are for example, multi-value color data D1, D2 and D3 representative of additive color mixing type three primary colors, red, green and blue, code data DC1 representative of gray scales of each component of the additive color mixing type three primary color in degenerated form, multi-value color data D4, D5, D6 and D7 representative of subtractive color mixing type four primary colors, cyan, magenta, yellow and black, a code data DC2 representative of gray scales of each component of the subtractive color mixing type four primary colors in degenerated form, a binary code data DC3 representative of presence and absence of ink ejection from respective printing head portions corresponding to used ink colors and a binary code data DCS3 as a code to be used when a special color is used, expressing presence and absence of ink ejection from respective printing head portions corresponding to ink colors when the binary data exceeds the 8 bit width in the code data DC3. The color data D1, D2, D3, D4, D5, D6 and D7 are 8 bit format per one pixel. The code data DC1, DC2 and DCS3 are 8 bit format per one pixel. The code data DC3 is a binary data of bit format n (n is integer) times of 8 bits per one pixel.

On the other hand, the input/output data communication portion 24 includes a data analyzing portion 24a which performs command judgment through analysis on the basis of an input command data in the data group DQ from the host computer 22 and feeds data representative of process demand of respective command to the operation control portion 38. The data analyzing portion 24a makes judgment whether the input command data is transfer command, printing command or other command and feeds data DR1, DR2 and DR3 representative of demand of process corresponding to respective command to the operation control portion 38.

The data transmission control portion 26 supplies each image component data to designated image memory portion in the storage portion 28 on the basis of a memory designation signal SM indicative of memory address and the image memory portion selected corresponding to the data form from the operation control portion 38.

The display/operating portion 40 is constructed with for example, a display portion of a liquid crystal screen and an operating portion constructed with an operation switch. The operating portion supplies the operation command data DK generated by operation of the operation switch to the operation control portion 38 through the data bass 34. On the other hand, the display portion displays operating condition of respective portion of the shown apparatus on the basis of the display operation control data DS from the operation control portion 38.

The storage portion 28 is constructed with a plurality of image memory portions 30i (i=1 to n, n is an integer) and an image memory control portion 32i (i=1 to n, n is integer) provided corresponding to the image memory portions 30i, respectively. Each memory portion 30i has 8 bit format per one pixel. In case of color data D1, D2, D3, for example, three image memory portion 30i are used. Respective image memory portions 30i individually stores the color data D1, D2 and D3. On the other hand, in case of the color data D4, D5, D6 and D7, four image memory portions 30i are used so that respective image memory portions 30i individually store the color data D4, D5, D6 and D7. Furthermore, in case of the code data DC1 and DC2, each one image memory portion 30i is used to individually store the code data DC1 and DC2. In case of the code data DC3, n in number of image memory portion 30i are used for individually storing code data DC3 per respective pixels. It should be noted that when special color data is supplied, one image memory portion 30i is used for each color data.

The image memory control portion 32i generates a writing timing signal of data depending upon the command signal SA including a memory selection signal provided from the operation control portion 38 and indicative of the image memory portion to be selected, and the designation signal indicative of address designation and size of the image component data stored. The writing timing signal is then supplied to respective image memory portions 30i. By this, respective data is written per respective image memory portions 30i. On the other hand, the image memory control portion 32i generates a read timing signal depending upon a reading start command signal included in the command signal SA and supplied to respective image memory portions 30i. By this, respective data stored in respective image memory portion 30i is read per one band width and sequentially supplied to the image processing portion 36 together with various synchronization signals and clock signal.

Then, the image memory control portions 32i generates the read timing signal for reading out data per the next one band width depending upon reading start designation signal included in the command signal SA subsequently supplied from the operation control portion 38. The image memory control portion 32i repeats operation for sequentially supplying the read timing signal to respective image memory portion 30i.

The image processing portion 36 includes an image component data selectively transmitting portion 50 selectively transmitting respective image component data supplied from the storage portion 28 per data type depending upon control data and control signal from the operation control portion 38, masking portions 52 and 54 performing masking data processing depending upon data type of respective image component from the image component data selectively transmitting portion 50, pallet converting portion 56 and 58 obtaining color data by making reference to color conversion data table on the basis of respective data from the image component data selectively transmitting portion 50, a color data selectively transmitting portion 60 selectively transmitting respective data from the image component data selectively transmitting portion 50, the color data from the masking portions 52 and 54 and color data from the pallet converting portions 56 and 58 and a multi-value/binary converting portions 62 and 64 performing binarization processing for the color data from the color data selectively transmitting portion 60, as shown in FIG. 1, for example. The image processing portion 36 includes in addition a binarized data selectively transmitting portion 66, signal distribution processing portions 68 and 70, registration adjusting portions 72 and 74, and drive control data selectively transmitting portion 76.

Figure 5:
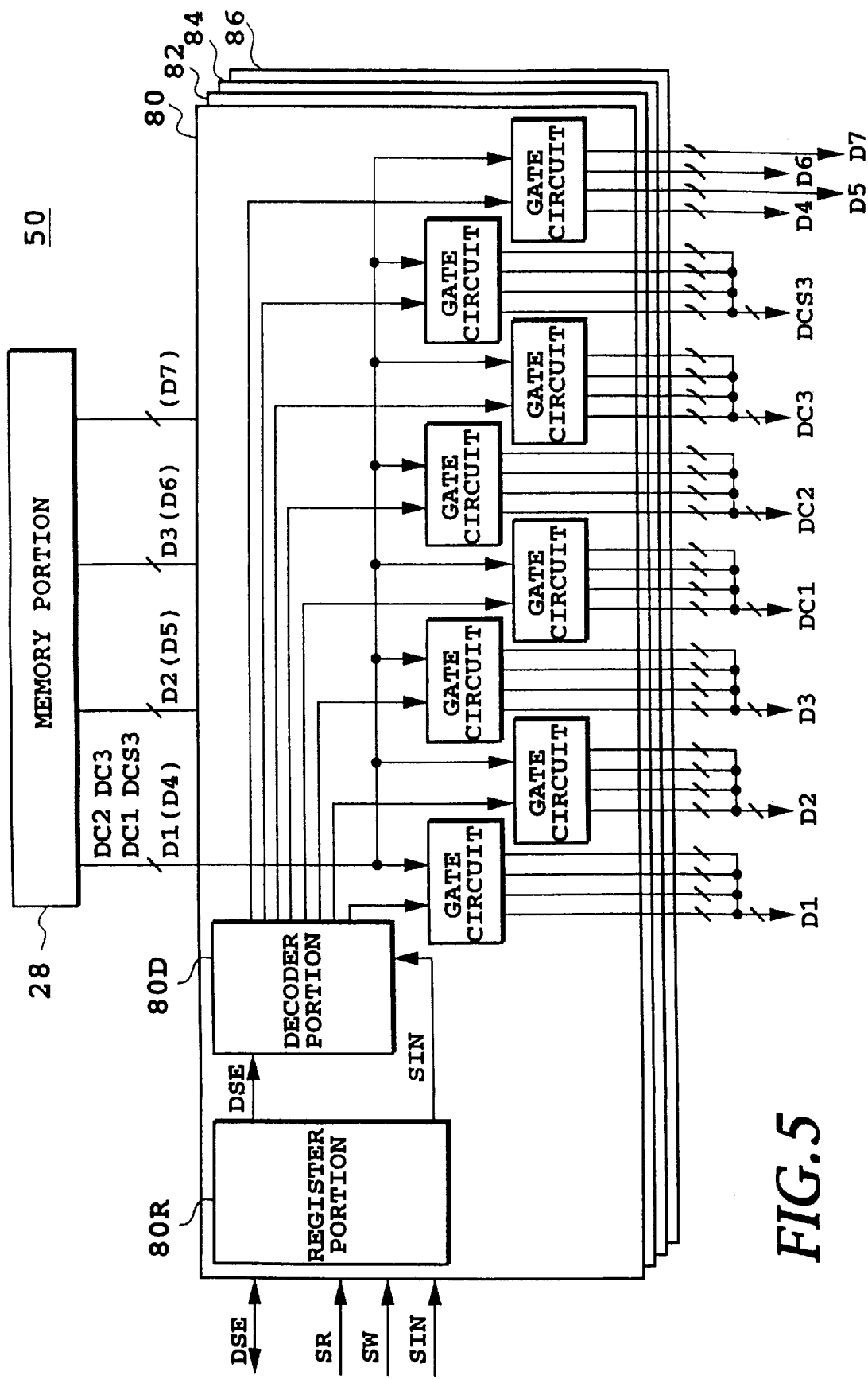
FIG. 5 is a block diagram showing an image component data selectively transmitting portion in the embodiment of FIG. 1.

The image component data selectively transmitting portion 50 includes selectively transmitting blocks 80, 82, 84 and 86, as shown in FIG. 5, for example. The selectively transmitting blocks 80, 82, 84 and 86 are respectively connected to image memory portions 30i, separately. Since the internal structure of respective selectively transmitting blocks are the same, discussion will be given only for the selectively transmitting block 80, and discussion for other selectively transmitting blocks will be neglected.

The selectively transmitting block 80 includes a register portion 80R for writing a gate selection code data DSE and an enabling signal SIN depending upon writing control signal SW from the operation control portion 38, eight gate circuit portions 80a, 80b, 80c, 80d, 80e, 80f, 80g and 80h respectively connected to the image memory portions 30i, and a decoder portion 80D establishing conducting state only to the gate circuit portion selected on the basis of the gate selection code data DSE and enabling signal SIN read from the register portion 80R.

The output side of the gate circuit portion 80a, 80b, 80c, 80d, 80e, 80f, 80g respectively are commonly connected to corresponding gate circuit portion in other selectively transmitting block.

In such construction, the color data D1 is supplied to the selectively transmitting block 80, and color data D2 is supplied to the selectively transmitting block 82, and the color data D3 is supplied to respective selectively transmitted blocks 84. Then, register portion 80R reads out the gate selection code data DSE and enabling signal SIN written depending upon the read control signal SR from the operation control portion 38 to supply respective decoder portions 80D. The decoder portion 80D conducts the gate circuit portion 80a on the basis of the gate selection code data DSE and the enabling signal SIN. On the other hand, in the selectively transmitting block 82, the decoder 82D conducts the gate circuit portion 82b. In the selectively transmitting block 84, the decoder portion 84D conducts the gate circuit portion 84c. By this, the color data D1, D2 and D3 are supplied to the masking portions 52 and 54.

When the code data DC1 is supplied to the selectively transmitting block 80, the register portion 80R reads out the gate selection code data DSE and the enabling signal SIN depending upon the read control signal SR from the operation control portion 38 to supply to decoder portion 80D respectively. The decoder portion 80D makes only gate circuit portion 80d conductive on the basis of the gate selection code data DSE and the enabling signal SIN. By this, the code data DC1 is supplied to the masking portions 52 and 54.

When the code data DC2 is supplied to the selectively transmitting block 80, the register portion 80R reads the gate selection code data DSE and the enabling signal SIN written depending upon the reading control signal SR from the operation control portion 38. The decoder portion 80D makes only gate circuit portion 80e conductive on the basis of the gate selection code data DSE and the enabling signal SIN. By this, the code data DC2 is supplied to the pallet converting portions 56 and 68.

When the code data DC3 is supplied to the selectively transmitting block 80, the register portion 80R reads the gate selection code data DSE and the enabling signal SIN written depending upon the read control signal SR from the operation control portion 38 to supply to decoder portion 80D respectively. The decoder portion 80D makes only gate circuit portion 80f conductive on the basis of the gate selection code data DSE and the enabling signal SIN. By this, the code data DC3 is supplied to the binarized data selectively transmitting portion 66.

When the code data DCS3 is supplied to the selectively transmitting block 80, the register portion 80R reads the gate selection code data DSE and the enabling signal SIN written depending upon the read control signal SR from the operation control portion 38 to supply to decoder portion 80D respectively. The decoder portion 80D makes only gate circuit portion 80g conductive on the basis of the gate selection code data DSE and the enabling signal SIN. By this, the code data DCS3 is supplied to the binarized data selectively transmitting portion 66.

When the color data D4 is supplied to the selectively transmitting block 80, the color data D5 is supplied to the selectively transmitting block 82 and the color data D6 is supplied to the selectively transmitting block 84, and the color data D7 is supplied to the selectively transmitting block 86, the register portion 80R reads the gate selection code data DSE and the enabling signal SIN written depending upon the read control signal SR from the operation control portion 38 to supply to decoder portion 80D respectively. The decoder portion 80D makes the gate circuit portion 80h conductive on the basis of the gate selection code data DSE and the enabling signal SIN. On the other hand, in the selectively transmitting block 82, the decoder portion 82D makes the gate circuit portion 82h conductive. Also, in the selectively transmitting block 84, the decoder portion 84D makes the gate circuit portion 84h conductive and, in the selectively transmitting block 86, the decoder portion 86D makes the gate circuit portion 86h conductive. By this, the color data D4, D5, D6 and D7 are supplied to the color data selectively transmitting portion 60.

Figure 6:
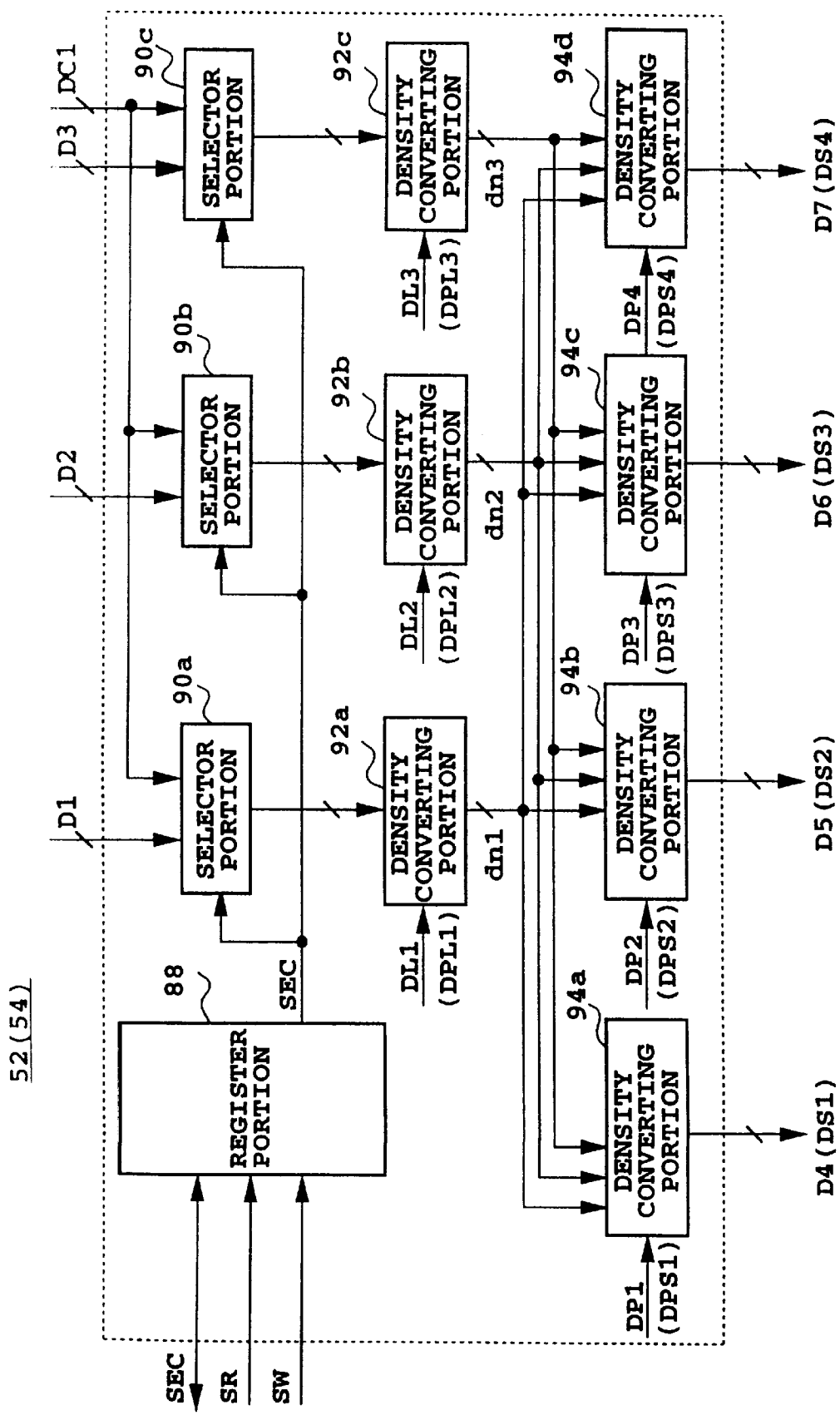
FIG. 6 is a block diagram showing a masking portion in the example shown in FIG. 1.

The masking portion 52 includes a register portion 88 for writing data selecting signal SEC depending upon writing control signal SW from the operation control portion 38, three selector portions 90a, 90b and 90c selects the color data and the code data on the basis of the data selection signal SEC read from the register portion 88 connected to the image component data selectively transmitting portion 50, respectively, density converting means 92a, 92b, 92c performing density conversion process with reference to a luminance/density conversion table on the basis of color data from respective selector portions 90a, 90b and 90c, and masking calculation portions 94a, 94b, 94c and 94d performing masking calculation of color synthesis on the basis of the density data from the density converting portions 92a, 92b and 92c as shown in FIG. 6, for example.

To the register portion 88, the writing control signal SW from the operation control portion 38 is supplied. Also, the data selection signal SEC and the read out control signal SR are supplied to the register portion 88. The register portion 88 writes the data selection signal SEC depending on the writing control signal SW and supplies the data selection signal SEC to respective selector portions 90a, 90b and 90c depending upon the reading control signal SR.

To the selector portion 90a, the color data D1 and the code data DC1 are supplied together with the data selection signal SEC. The select portion 90a selects one of the color data D1 and the code data DC1 on the basis of the data selection signal SEC and supplies the selected data to the density converting portion 92a. To the selector portion 90b, the color data D2 and the code data DC1 are supplied together with the data selection signal SEC. The select portion 90b selects one of the color data D2 and the code data DC1 on the basis of the data selection signal SEC and supplies the selected data to the density converting portion 92b. To the selector portion 90c, the color data D2 and the code data DC1 are supplied together with the data selection signal SEC. The select portion 90c selects one of the color data D2 and the code data DC1 on the basis of the data selection signal and supplies the selected data to the density converting portion 92c.

To the density converting portions 92a, 92b and 92c, the luminance/density conversion table data DL1, DL2 and DL3 from the operation control portion 38 are supplied together with the color data and the code data. The luminance/density conversion table data DL1, DL2 and DL3 are variable depending upon the data type, for example, and convert the luminance component data in respective color data into the density data by a logarithmic function.

The density converting portion 92a is responsive to the color data D1 to perform the density conversion process on the basis of the color data D1 with reference to the luminance/density conversion table data DL1 to obtain the density data dn1. The density data dn1 is supplied to respective of the masking calculating portions 94a, 94b, 94c and 94d. The density converting portion 92b is responsive to the color data D2 to perform the density conversion process on the basis of the color data D2 with reference to the luminance/density conversion table data DL2 to obtain the density data dn2. The density data dn2 is supplied to respective of the masking calculating portions 94a, 94b, 94c and 94d. The density converting portion 92c is responsive to the color data D3 to perform the density conversion process on the basis of the color data D3 with reference to the luminance/density conversion table data DL3 to obtain the density data dn3. The density data dn3 is supplied to respective of the masking calculating portions 94a, 94b, 94c and 94d.

To the masking calculation portion 94a, density data dn1, dn2 and dn3 are supplied. Also, a parameter data DP1 for calculation is also supplied to the masking calculation portion 94a from operation control portion 38. The parameter data DP1 represents a, b and c in a masking expression (CX=a·dn1+b·dn2+c·dn3) for obtaining the color data CX. The parameter data DP2 is set so that the color data CX represents a color data D4.

To the masking calculation portion 94b, density data dn1, dn2 and dn3 are supplied. Also, a parameter data DP2 for calculation is also supplied to the masking calculation portion 94b from operation control portion 38. The parameter data DP2 represents a, b and c in a masking expression (CX=a·dn1+b·dn2+c·dn3) for obtaining the color data CX. The parameter data DP2 is set so that the color data CX represents a color data D5.

To the masking calculation portion 94c, density data dn1, dn2 and dn3 are supplied. Also, a parameter data DP3 for calculation is also supplied to the masking calculation portion 94c from operation control portion 38. The parameter data DP3 represents a, b and c in a masking expression (CX=a·dn1+b·dn2+c·dn3) for obtaining the color data CX. The parameter data DP3 is set so that the color data CX represents a color data D6.

To the masking calculation portion 94d, density data dn1, dn2 and dn3 are supplied. Also, a parameter data DP4 for calculation is also supplied to the masking calculation portion 94d from operation control portion 38. The parameter data DP4 represents a, b and c in a masking expression (CX=a·dn1+b·dn2+c·dn3) for obtaining the color data CX. The parameter data DP4 is set so that the color data CX represents a color data D7. By these, respective masking calculation portions 94a to 94d performs calculation according to respective masking expressions to derive the color data D4, D5, D6 and D7. It should be noted that the expression should not be limited to the shown example, and can be an expression having secondary term.

On the other hand, when the code data DC1 is supplied to the density converting portions 92a, 92b and 92c, pallet data DPL1, DPL2, DPL3, each of which has 256 bites size, for example, are supplied from the operation control portion 38. The pallet data DPL1, DPL2 and DPL3 represent gray scale of the color data D1. D2. D3 corresponding to the code data DC1. For example, when the code data DC1 is zero, it represent black, then the gray scales of respective color data D1, D2 and D3 become (0, 0, 0). Respective density converting portions 92a, 92b and 92c obtain color data D1, D2 and D3 with reference to the pallet data DPL1, DPL2 and DPL3. Then, similar density conversion process is performed on the basis of the gray scale of obtained color data. By this, by the density converting portions 92a, 92b and 92c, the density data dn1, dn2 and dn3 are obtained similarly to the above. Also, obtained density data dn1, dn2 and dn3 are supplied to respective masking calculation portions 94a to 94d to obtain the color data D4, D5, D6 and D7.

Since the structure of the masking portion 54 is similar to the structure of the masking portion 52 except that the parameter data DP1, DP2, DP3 and DP4 are supplied to respective masking calculation portions 94a, 94b, 94c and 94d, overlapping discussion will be neglected.

On the other hand, in the masking portion 54, in place of the parameter data DP1, DP2, DP3 and DP4 in the masking portion 52, parameter data DPS1, DPS2, DPS3 and DPS4 for synthesizing special colors are supplied. The parameter data DPS1, DPS2, DPS3 and DPS4 are set so that the desired color data DS1, DS2, DS3 and DS4 can be obtained in the masking calculation portions 94a, 94b, 94c and 94d. By this, the masking calculation portions 94a, 94b, 94c and 94d performs calculation according to the masking expression with reference to the parameter data DPS1, DPS2, DPS3 and DPS4 on the basis of supplied density data dn1, dn2 and dn3 to obtain the special color data DS1, DS2, DS3 and DS4. It should be noted that the expression is not limited to the foregoing, but matrix calculation or mapping may also be employed.

To the pallet converting portions 56 and 58, code data DC2 is supplied. Also, 256 bite size subtractive color mixing type pallet table data DPP1 and DPP2 are supplied from the operation control portion 38. The code data DC2 represents gray scale of respective of color data D4, D5, D6 and D7, for example. When the code data DC2 is 0, for example, the gray scales of respective color data D4, D5, D6 and D7 are (0, 0, 0, 0) and thus represent white. When the code data DC2 is 01, for example, the gray scales of respective color data D4, D5, D6 and D7 are (255, 0, 0, 0) and thus represent black.

When the code data DC2 is 02, for example, the gray scales of respective color data D4, D5, D6 and D7 are (0, 80, 80, 0) and thus represent blue. By this, the pallet converting portions 56 and 58 obtains the desired color data PD1 to PD4 and PD5 to PD8 with reference to the pallet table data DPP1 and DPP2. Respective color data PD1 to PD4 and PD5 to PD8 are supplied to the color data selectively transmitting portion 60.

Figure 7:
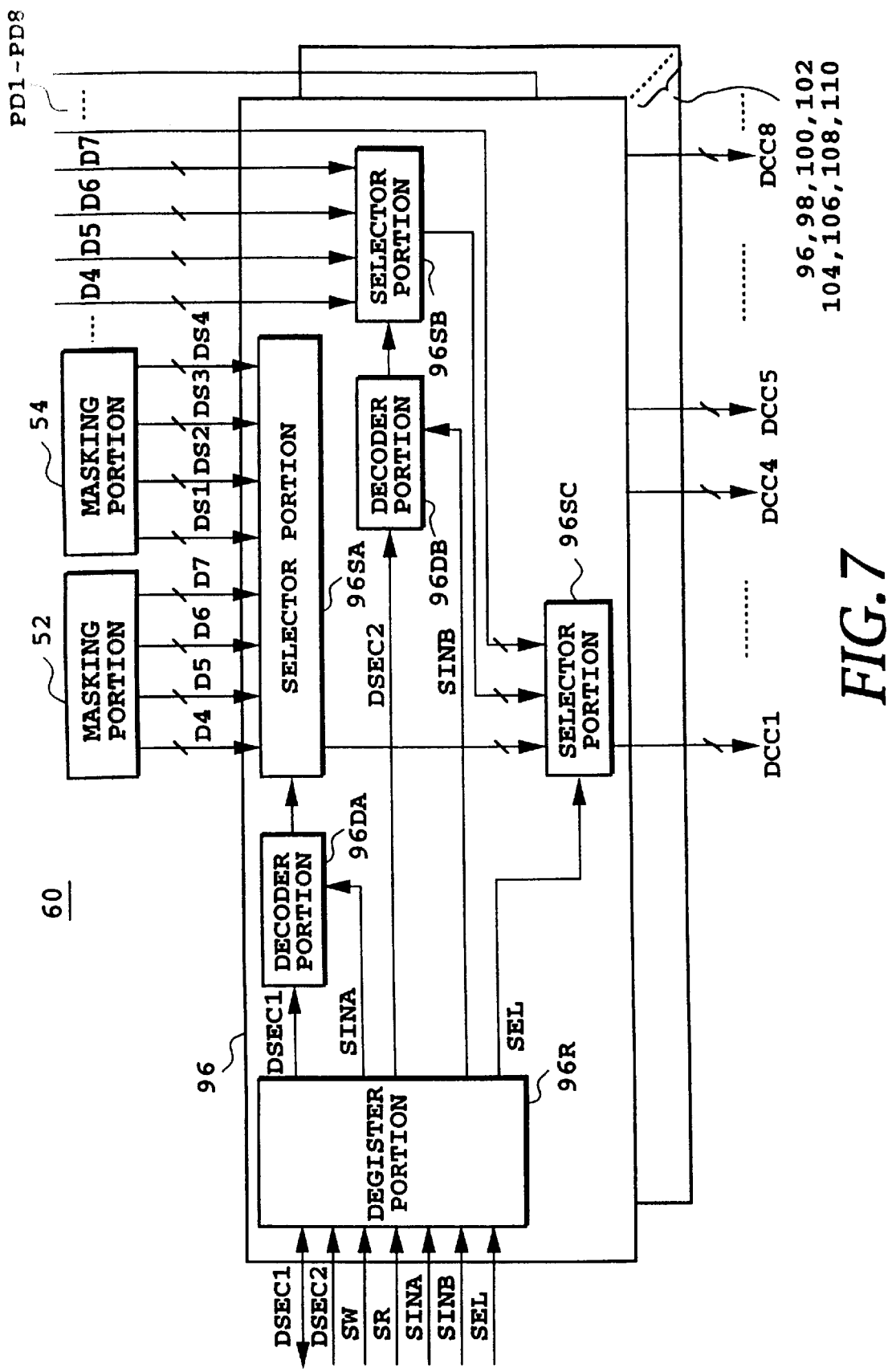
FIG. 7 is a block diagram showing a color data selectively transmitting portion in the example shown in FIG. 1.

As shown in FIG. 7, the color data selectively transmitting portion 60 is constituted of eight color data selectively transmitting blocks 96, 98, 100, 102, 104, 106, 108 and 110. The color data selectively transmitting blocks 96, 98, 100, 102, 104, 106, 108 and 110 are connected to image component data selectively transmitting portion 50, the masking portions 52 and 54. On the other hand, to the color data selectively transmitting blocks 96, 98, 100, 102, one of the data bus in the pallet converting portion 56 is connected, to the color data selectively transmitting blocks 104, 106, 108 and 110, one of the data bus in the pallet converting portion 58 is connected. The internal structure of respective color data selectively transmitting blocks are the same. Therefore, discussion will be given only for the color data selectively transmitting block 96, discussion for other selectively transmitting block will be neglected.

The color data selectively transmitting block 96 is constructed with a register portion 96R writing the selection code data DSEC1, the selection code data DSEC2, the selection signal SEL, enabling signals SINA and SINB corresponding to writing control signal SM from the operation control portion 38, a selector portion 96SA connected to the masking portions 52 and 54, a selector portion 96SB connected to the image component data selectively transmitting portion 50, a decoder portion 96DA generating a control signal on the basis of the selection code data DSEC1 read from the register portion 96R and the enabling signal SINA and supplying the control signal to the selector portion 96SA to make the latter to perform selecting operation, a decoder portion 96DB generating a control signal on the basis of the selection code data DSEC2 read from the register portion 96R and the enabling signal SINA and supplying the control signal to the selector portion 96SB to make the latter to perform selecting operation, and a selector portion 96SC for selecting one of the color data supplied from selector portion 96SB, the color data supplied from the selector portion 96SB and the color data PDI from the pallet converting portion 56 on the basis of the select signal SEL read from the register portion 96R.

To the register portion 96R, the selection code data DSEC1, the selection code data DSEC2, the selection signal SEL, the enabling signals SINA and SINB are supplied from the operation control portion 38. Also, the writing control signal SW and reading control signal SR are supplied to the register portion 96R. The register portion 96R reads out the selection code data DSEC1 and the enabling signal SINA in response to the reading control signal SR to supply the decoder portion 96DA and reads out the selection code data DSEC2 and the enabling signal SINB to supply the decoder portion 96DB. Also, the register portion 96R reads out the selection signal SEL to supply the selector portion 96SC.

The decoder portion 96DA generates a control signal on the basis of the selection code data DSEC1 and the enabling signal SINA for supplying to the selector portion 96SA. By this, the selector portion 96SA selects one of the color data D4, D5, D6, D7, DS1, DS2, DS3 and DS4 in response to the control signal for supplying to the selector portion 96SC.

The decoder portion 96DB generates a control signal on the basis of the selection code data DSEC2 and the enabling signal SINB for supplying to the selector portion 96SB. By this, the selector portion 96SB selects one of the color data D4, D5, D6, D7 in response to the control signal for supplying to the selector portion 96SC.

To the selector portion 96SC, one color data from the selector portion 96SA, one color data from the selector portion 96SB and one color data PDI from the pallet converting portion 56 are supplied. To the selector portion 96SC, one of color data DCC1 is selected on the basis of the selection signal SEL and supplied to the multi-value/binary converting portion 62.

The color data selectively transmitting blocks 98, 100 and 102 similarly select the color data DCC2, DCC3 and DCC4. These are supplied to the multi-value/binary converting portion 62.

The color data selectively transmitting blocks 104, 106, 109 and 110 similarly select the color data DCC 5, DCC 6, DCC 7 and DCC 8, respectively. These are supplied to the multi-value/binary converting portion 64.

As shown in FIG. 1, the multi-value/binary converting portions 62 and 64 have the identical construction to each other. Therefore, discussion will be given only for the multi-value/binary converting portion 62, and discussion for the multi-value/binary converting portion 64 will neglected.

The multi-value/binary converting portion 62 includes a density correcting portion 62 for performing calculation for correction for fluctuation of ejection amount in each individual printing heads for the color data DCC1, DCC2, DCC3 and DCC4, an output gamma conversion portion 62b for correcting the corrected data so that the output data having gray scale proportional to the gray scale of the corrected data from the density correcting portion 62a, and a binarization processing portion 62a for performing binarization for the color data from the output gamma converting portion.

To the density correcting portion 62a, in addition to the color data DCC1 to DCC4, density correction data DDH is supplied from the operation control portion 38. Four density correction data DDH are set corresponding to at least color data DCC1 to DCC4, and are data for correcting fluctuation of density due to fluctuation of the ink amount ejected through the ejection openings in the used printing head portions. The density correction data DDH is consisted of 8 bit color data and address data indicative of number of respective ejection openings. The capacity of the density correction data DDH becomes an amount (bites) multiplied product of 256 and number of ejection openings. The density correcting portion 62a derives the color data corrected with reference to the density correction data DCH on the basis of one data among color data DCC1 to DCC4.

To the output gamma converting portion 62b, in addition to the corrected color data from the density correcting portion 62a, a gamma table data DDG is supplied from operation control portion 38. At least four gamma table data DDG are set for processing respective of color data DDC1 to DCC4. The gamma table data is for correcting image proportional to the input image data since the image data formed on the printing medium tends not to proportional to the input image data. On the other hand, the gamma table data DDG may include data for increasing density for specific density or for decreasing density for highlighting. The output gamma converting portion 62b performs converting calculation with reference to the gamma table data DDG on the basis of the corrected color data. Thus, converted color data is obtained.

It should be noted that, in the printing head portion, if the high and low density inks are used, the color data DCC1 and DCC5 to be supplied to the output gamma converting portions 62b and 64b are set to be the same color. On the other hand, it is also possible that one of the gamma table data DDG is set as gray scale correction table data for the high density coot, and the other gamma table data DDG is set as gray scale correcting table data for low density color.

The binarization processing portion 62c performs binarization process for respective of gray scale corrected color data from the output gamma converting portion 62b by employing one production method by density of each element, namely dither matrix method or error variance method. Thus, binary data N1, N2, N3 and N4 can be obtained per respective color data. Also, in the binarization processing portion 64, binary data N5, N6, N7 and N8 may be obtained with respect to the color data.

Figure 8:
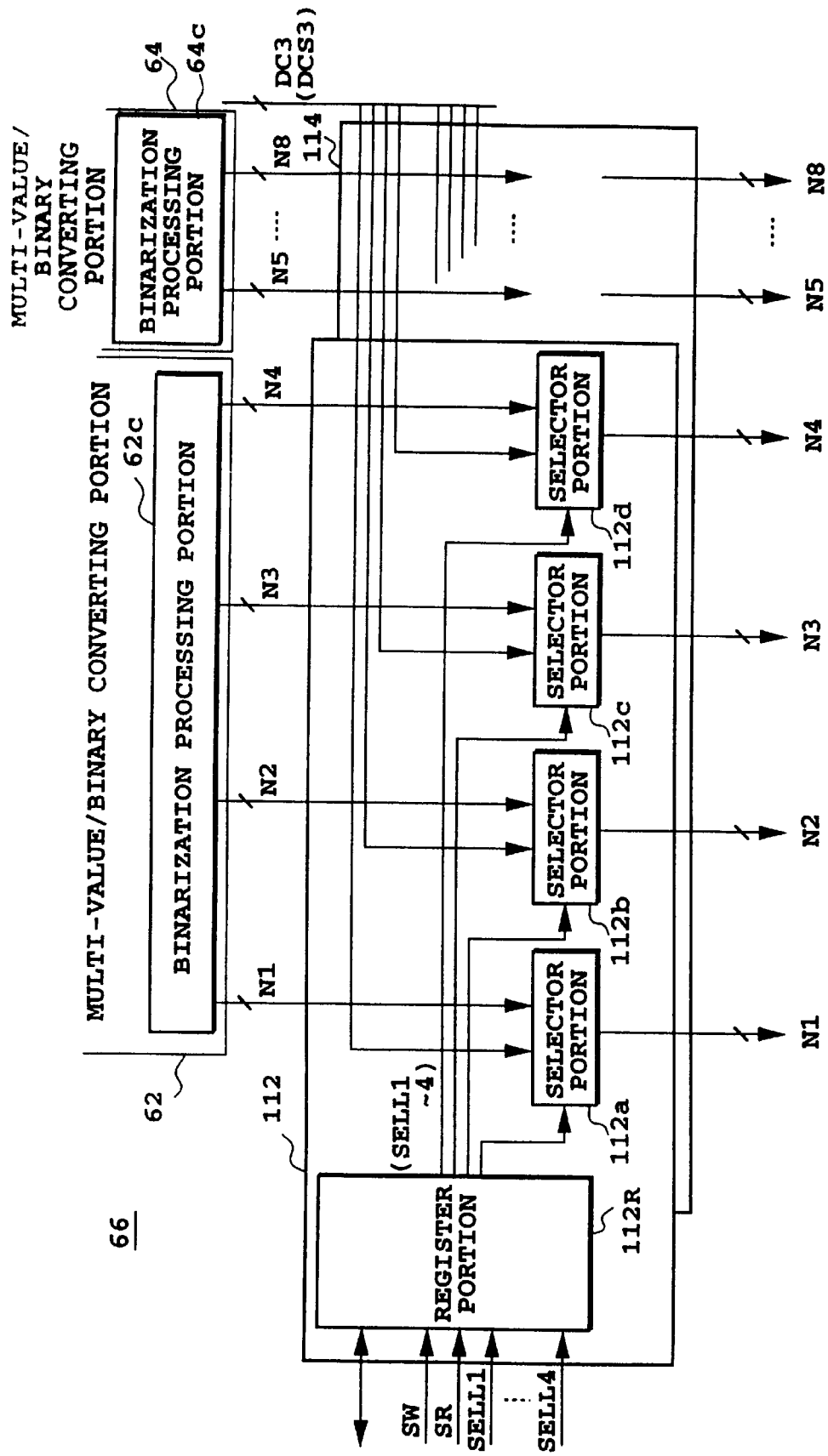
FIG. 8 is a block diagram showing a binarized data selectively transmitting portion in the embodiment shown in FIG. 1.

As shown in FIG. 8, for example, the binarized data selectively transmitting portion 66 is constituted of binarized data selectively transmitting blocks 112 and 114. Since the binarized data selectively transmitting blocks 112 and 114 have mutually identical construction, discussion will be given only for the binarized data selectively transmitting block 112, and discussion for the binarized data selectively transmitting block 114 will be neglected.

The binarized data selectively transmitting block 112 includes registers 112R for writing selector signals SELL1 to SELL4 in response to the writing control signal from the operation control portion 38, and selector portions 112a, 112b, 112c and 112d, to which the binarized data N1, N2, N3 and N4 are supplied from the binarization processing portion 62c in the multi-value/binary converting portion 62. To the register 112R, the reading control signal SR from the operation control portion 38 in addition to the writing control signal SW and the select signal SELL. The register portion 112R supplied the selector signals SELL1 to SELL4 to respective selector portions 112a, 112b, 112c and 112d in response to the reading control signal SR.

To respective selector portions 112a, 112b, 112c and 112d, in addition to the binarized data N1, N2, N3 and N4, the code data DC3 or DCS3 is supplied per one bit unit. The selector portions 112a, 112b, 112c and 112d are responsive to the selector signals SELL1 to SELL4 supplied from the register portion 112R to perform selecting operation to feed 4 bit data among the binarized data N1, N2, N3 and N4 or the code data DC3 or DCS3 to respective signal distribution processing portions 68 together with synchronization signal. Also, in the binarization data selectively transmitting block 114, 4 bit data among the binarized data N5, N6, N7 and N8 or the code data DC3 or DCS3 is fed to the signal distribution processing portion 70 together with the synchronization signal.

The signal distribution processing portion 68 divides respective binarized data into one band binarized data to be supplied to the printing head portion 16 and another one band binarized data to be supplied to the printing head portion 18 on the basis of the 4 bit data among the binarized data N1, N2, N3 and N4 or the code data DC3 or DCS3. The signal distribution processing portion 68 feeds the resultant two binarized data to registration adjusting portion 72. The signal distribution processing portion 70 divides respective binarized data into one band binarized data to be supplied to the printing head portion 16 and another one band binarized data to be supplied to the printing head portion 18 on the basis of the 4 bit data among the binarized data N5, N6, N7 and N8 or the code data DC3 or DCS3. The signal distribution processing portion 70 feeds the resultant two binarized data to registration adjusting portion 74. It should be noted that dividing of the binarized data into the binarized data to be supplied to the printing head portion 16 and the binarized data to be supplied to the printing head portion 18 has been disclosed in commonly owned Japanese Patent Application No. Heisei 4-79858. The disclosure of the above-identified Japanese Patent Application is herein incorporated by reference.

The registration adjusting portions 72 and 74 perform raster BJ conversion for matching the arrangement of the binarized data from the signal distribution processing portions 68 and 70 with the arrangement of the ejection openings in the printing head portions 16 and 18. The registration adjusting portions 72 and 74 further performs registration adjustment in the primary scanning direction and the auxiliary scanning direction. Since the registration adjusting portions 72 and 74 have the identical construction, discussion will be given only for the registration adjusting portion 72 and the discussion for the registration adjusting portion 74 will be neglected.

The registration adjusting portion 72 includes a band buffer memory portion 72BM temporarily storing the binarized data derived by dividing the 4 bit data among the binarized data N1, N2, N3 and N4 or the code data DC3 or DCS3, and a plurality of line buffer memories 72LM registering respective data for one band read from the band buffer memory portion 72BM in a bit construction corresponding to number of ink ejection openings.

The band buffer memory portion 72BM is provided corresponding to respective ink color, for example and is constituted of a first memory portion having a capacity for storing 2 band date corresponding to the printing head portion 16 and a second memory portion storing data corresponding to the printing head portion 18. The second memory portion is provided with storage capacity for data for a gap UG [=(2n+1) ÅE Hn/2, wherein n is an integer, and Hn represents number of ink ejection openings], namely for (n+2) band. To the band buffer memory 72BM, reading out start memory address data and reading out timing control signal are supplied from the operation control portion 38. The band buffer memory 72BM reads out respective data on the basis of the read out start memory address data and the read out timing control signal and supplied the read out data to the line buffer memory 72LM. At this time, concerning respective of the read out data, arrangement conversion is performed for respective data in the primary scanning direction by the operation control portion 38 so that the arrangement of respective data is in the auxiliary scanning direction per arrangement of the ejection openings in the printing head array portions 16 and 18. The re-arranged data is supplied to the line buffer memory 72LM.

To the line bugger memory 72LM, a read out timing control signal based on the data representative of the head gap and the data representative of the registration adjusting amount from the operation control portion 38. The line buffer memory 72LM reads out respective of stored data in response to the read out timing control signal to supply to the drive control data selectively transmitting portion 76 together with the synchronization signal. By this, the divided respective color data FN1, BN1, FB2, BN2, FN3, BN3, FN4 and BN4 corresponding to the printing head portions 16 and 198 are read out from the line buffer memory 72LM, and fed to the driving control data selectively transmitting portion 76. On the other hand, the timing of reading out of respective data from respective line buffer memories 72LM to adjust the registration in the primary scanning direction and the auxiliary scanning direction.

In the registration adjusting portion 74, respective color data FN5, BN5, FN6, BN6, FN7, BN7, FN8 and BN8 are read out and supplied to the drive control data selectively transmitting portion 76.

Figure 9A:
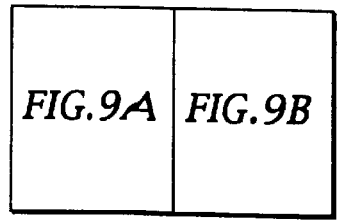
FIG. 9 is a block diagram showing a drive control data selectively transmitting portion in the embodiment shown in FIG. 1.
Figure 9A:
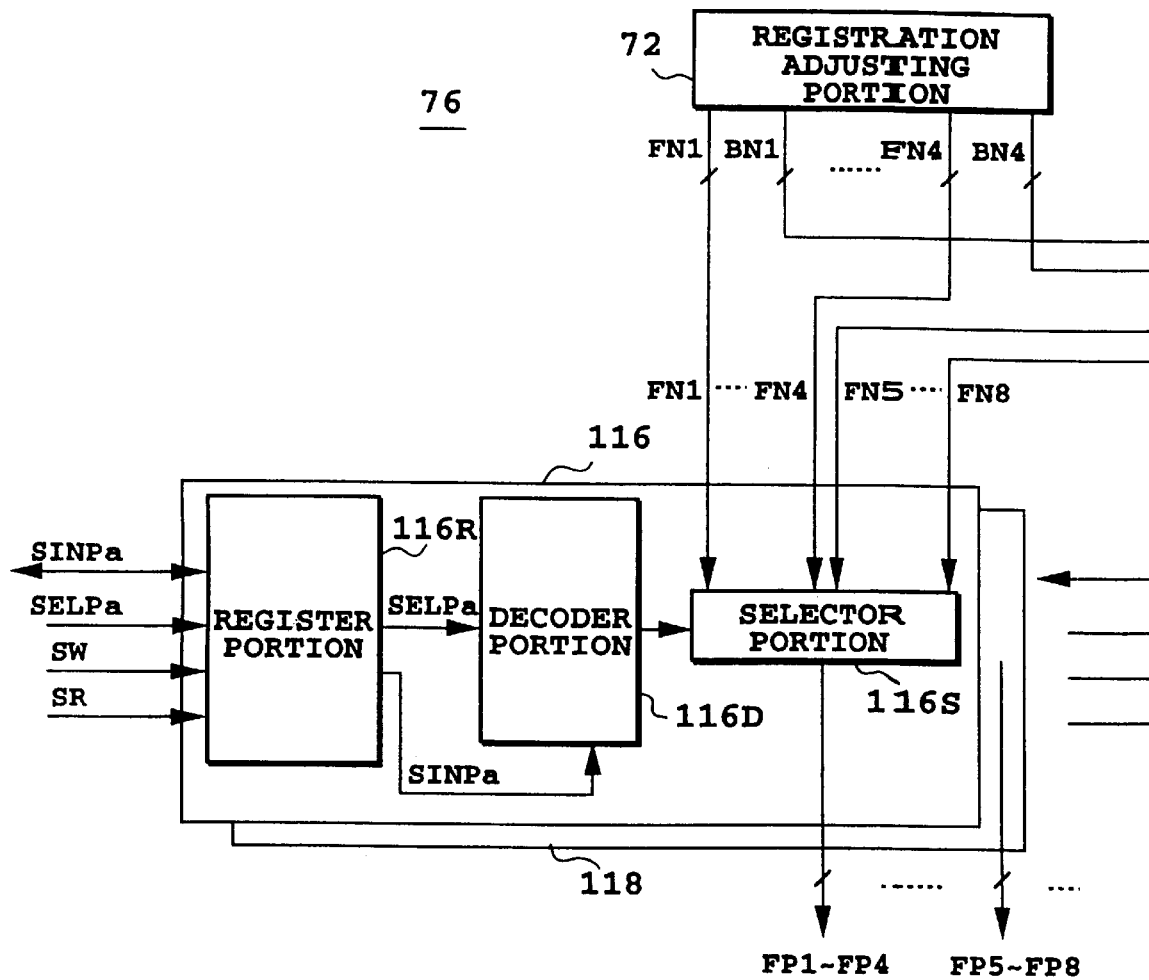
Figure 9B:
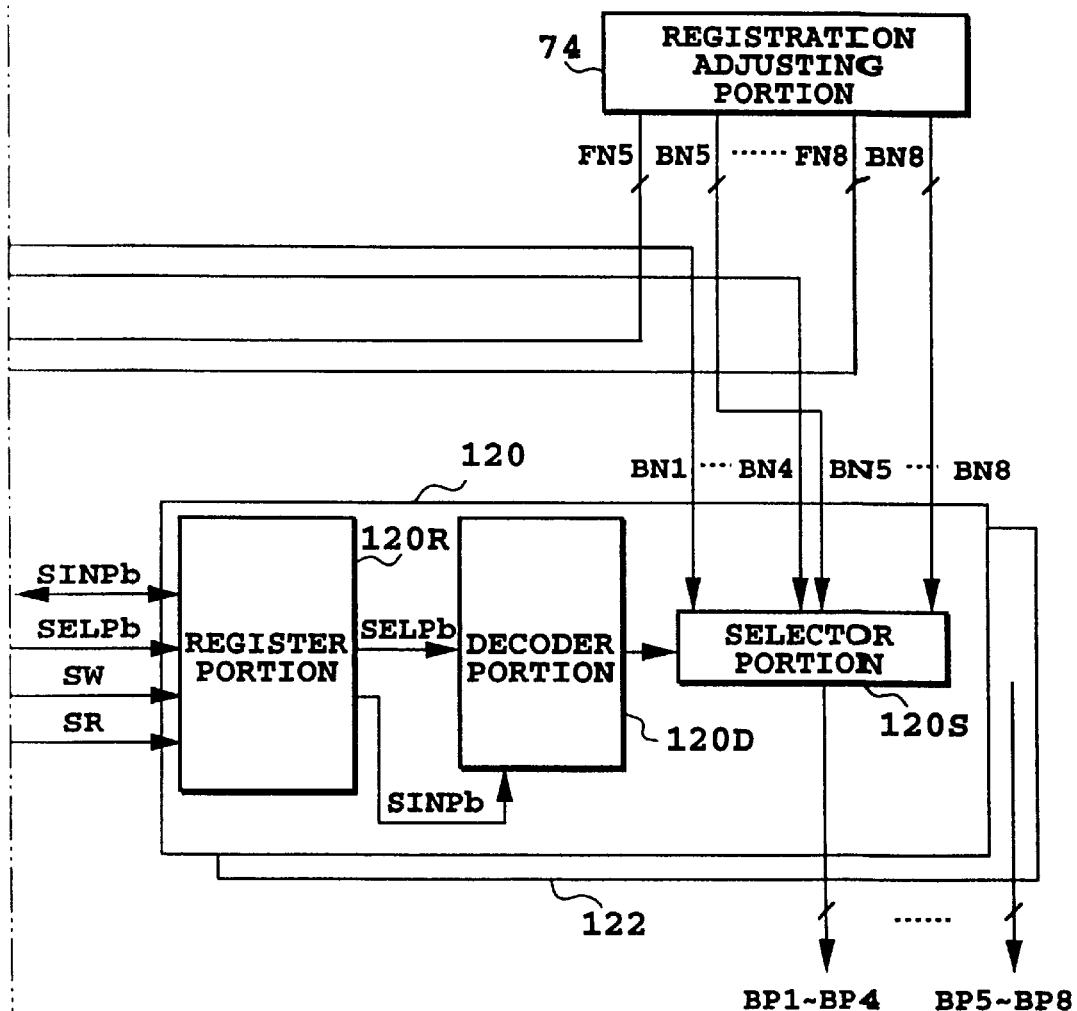

As shown in FIG. 9, for example, the driving control data selectively transmitting portion 76 is constituted of data selectively transmitting block portions 116, 118, 120 and 122. The data selectively transmitting block portions 116 and 118 shares operation for selectively transmitting respective color data FN1 to FN8 of 1 bit construction from the registration adjusting portions 72 and 74. Also, the data selectively transmitting block portions 120 and 122 share operation for selectively transmitting respective color data BN1 to BN4 in one bit construction from the registration adjusting portions 72 and 74.

To the data selectively transmitting block portions 116 and 118, respective color data FN1 to FN8 are supplied. Since the constructions in the data selectively transmitting block portions 116 and 118 are identical, discussion will be given only for the data selectively transmitting block portion 116 and discussion for the data selectively transmitting block portion 118 will be neglected.

As shown in FIG. 9, the data selectively transmitting block portions 116 has a register 116R for writing in the selection signal SELPa and an enabling signal SINPa in response to the writing control signal from the operation control portion 38, a decoder portion 116D feeding a selection control signal to a selector 116S on the basis of the selection signal SELPa and the enabling signal SINPa read from the register portion 116R, and the selector portion 116S for selecting the color data FN1 to FN4 among respective color data FN1 to FN8, for example on the basis of the selection control signal from the decoder portion 116D.

To the register portion 116R, the reading control signal SR is also supplied from the operation control portion 38. The register portion 116R is responsive to the read control signal SR to feed the selection signal SELPa and the enabling signal SINPa. The decoder 116D generates the selection control signal on the basis of the selection signal SELPa and the enabling signal SINPa for feeding to the selector portion 116S. The selector portion sequentially selects the color data FN1 to FN4 among the color data FN1 to FN8 on the basis of the selection signal SELPa for feeding to the printing head drive control portions 16ka to 16kh as printing operation control data DF together with drive control data FP1, FP2, FP3 and FP4 of one bit constriction and the drive control data FP5, FP6, PF7 and FP8 from the data selectively transmitting block portion 118.

To the data selectively transmitting block portions 120 and 122, respective color data BN1 to BN8 are supplied. The constructions of the data selectively transmitting block portions 120 and 122 are the same. Therefore, discussion will be given only for the data selectively transmitting block portion 120 and discussion for the data selectively transmitting block 122 will be neglected.

As shown in FIG. 9, the data selectively transmitting block portions 120 has a register 116R for writing in the selection signal SELPb and an enabling signal SINPb in response to the writing control signal from the operation control portion 38, a decoder portion 120D feeding a selection control signal to a selector 120S on the basis of the selection signal SELPb and the enabling signal SINPb read from the register portion 120R, and the selector portion 120S for selecting the color data BN1 to BN4 among respective color data BN1 to BN8, for example on the basis of the selection control signal from the decoder portion 120D.

To the register portion 120R, the reading control signal SR is also supplied from the operation control portion 38. The register portion 120R is responsive to the read control signal SR to feed the selection signal SELPb and the enabling signal SINPb. The decoder 120D generates the selection control signal on the basis of the selection signal SELPb and the enabling signal SINPb for feeding to the selector portion 120S. The selector portion 120S sequentially selects the color data BN1 to BN4 among the color data BN1 to BN8 on the basis of the selection signal for feeding to the printing head drive control portions 18ka to 18kh as printing operation control data DF together with drive control data BP1, BP2, BP3 and BP4 of one bit constriction and the drive control data BP5, BP6, BP7 and BP8 from the data selectively transmitting block portion 122.

The operation control portion 38 performing operation control as set forth above includes a storage portion 38ra storing the input image data region and also stores data type and number of image memory portions 30i and so forth, a storage portion 38ro storing operation command program data, registration data and table data, and a central arithmetic processing portion 38c for generating operation control signals, such as the selection code data, the selection signal, the enabling signal and so forth.

The operation control portion 38 is supplied data representative of kind of commands, such as transfer command, printing command and other command requiring process, data indicative of the ink color to be used in the printing head array portions 16 and 18, data indicative of the image component data, for which output demand is present among image component data stored in the image memory portion 30i.

At first, the operation control portion 38 initializes the input/output communication portion 24, the storage portion 28, the image processing portion and so forth and perform initial setting of the carriage drive control portion 42 by supplying the control data DC. In conjunction therewith, the operation control portion 38 actuates not shown mechanism for avoiding plugging in the printing head array portions 16 and 18 to perform ink ejection recovery operation and suction recovery operation. The operation control portion 38 then supplies a display operation control data DS to the display/operation portion 40 after making connection between the input/output data communicating portion 24 and the host computer 22 effective. By this, in the display/operation portion 40, display indicative of ready condition is performed.

When data group DQ is supplied to the input/output data communicating portion 24 from the host computer 22, the operation control portion 38 performs process on the basis of the data DR1, DR2 and DR3 indicative of the demand of process corresponding to respective command from the data analyzing portion 24a.

When data DR1 indicative of transfer command is supplied, the operation control portion 38 makes judgment of the data type on the basis of extension of a file name in the data DR, selects and designates the image memory portion 30i corresponding to the data type, and set memory address region depending upon number of the image memory portions 30i and the image component data. The image memory portion not written and read is excluded from selection. The operation control portion 38 further stores data type stored in the selected image memory portion 30i. The operation control portion 38 preliminarily stores number of the image memory portion 30i provided in the system, and is responsive to judgment of lacking of the image memory portions 30i to feed data indicative of lacking of memory to the host computer. The operation control portion 38 feeds the memory designation signal SM to the data transfer control portion 26, and in conjunction therewith feeds a command signal to the image memory control portion 32i in the storage portion 28. On the other hand, the operation control portion 38 disables outputting for the image memory portion 30i, in which the image component data is not stored or no output demand therefor is present. By this, the data transfer control portion 26 directly transfer respective image component data of the image data DG from the input/output data communication portion 24 to respective image memory portions 30a . . . 30n in the storage portion 28 on the basis of the memory designation signal. The image memory control portion 32i performs write-in operation for respective image memory portions 30i . . . 30n on the basis of the command signal SA and sequentially read out 1 band image component data from the designated image memory portion 30i to supply to the image component data selectively transmitting portion 50 in the image processing portion 36 together with respective synchronization signal and clock signal. At this time, the operation control portion 38 detects reading output condition of respective data from the storage portion 28 by the internal counter. When respective data for one band is read out from respective image memory portions 30a . . . 30n, the operation control portion 38 repeats operation for again feeding the command signal SA for sequentially performing reading of data for subsequent one band to respective image memory control portion 32i until judgment is made that completion of printing on the basis of the data of the internal counter. On the other hand, the operation control portion 38 is responsive to the judgment that printing is completed on the basis of the data of the internal counter, to return components of the printing apparatus to the initial state.

When respective color data D1 to D7, code data DC1 to DC3 and DCS3 are supplied to the image component data selectively transmitting portion 50 in the image processing portion 36, the operating control portion 38 preliminarily supplies the gate selection code data DSE and the enabling signal SIN together with the writing control signal SW, and supplies the reading control signal SW to respective register portions 80R to 86R upon operating respective data selectively transmitting block portions 80, 82, 84 and 86. By this, color data D1 to D3 and the code data DC1 are supplied to the masking portions 52 and 54 and thus the color data D4 to D7 are supplied to the color data selectively transmitting portion 60. Also, the code data DC2 is supplied to the pallet converting portions 56 and 58 and the code data DC3 and DCS3 are supplied to the binarized data selectively transmitting portion 66.

Upon performing density conversion process and the masking calculation process in the masking portion, the operation control portion 38 supplies the writing control signal SW together with the data selection signal SEC to the register portion 88, and also supplies the reading control signal SR. Furthermore, the operation control portion 38 supplies the luminance/density conversion table data DL1, DL2 and DL3 to respective density converting portions 92a, 92b and 92c and supplies the parameter data DP1, DP2, DP3 and DP4 to respective masking calculation portions 94a, 94b, 94c and 94d. By this, in respective of the density converting portions 92a, 92b and 92c, density conversion process is performed to derive the density data dn1, dn2 and dn3. The density data dn1, dn2 and dn3 thus obtained are supplied to the masking calculation portions 94a, 94b, 94c and 94d for deriving the color data D4 to D7. On the other hand, upon performing the density converting process and the masking calculation process, the operation control portion 38 similarly feeds the writing control signal SW together with the data selection signal SEC, and also supplies the reading control signal to the register 88. Furthermore, the operation control portion 38 supplies the luminance/density conversion table data DPL1, DPL2 and DPL3 to respective density converting portions 92a, 92b and 92c and supplies the parameter data DPS1, DPS2, DPS3 and DPS4 to respective masking calculation portions 94a, 94b, 94c and 94d. By this, in respective of the masking calculation portions 94a, 94b, 94c and 94d, special color data DS1, DS2, DS3 and DS4.

The operation control portion 38 supplies pallet table data DPP1 and DPP2 for obtaining desired color data PD1 to PD4 and PD5 to PD8 on the basis of the code data DC2 in the pallet converting portions 56 and 58. By this, in the pallet converting portion 56, the color data PD1 to PD4 are obtained with reference to the pallet table data DPP1. On the other hand, in the pallet converting portion 58, the color data PD5 to PD8 are obtained with reference to the pallet table data DPP2. Accordingly, the color data D4 to D7, the special color data DS1 to DS4, the color data PD1 to PD8 respectively depending on a plurality of input data type are supplied to the color data selectively transmitting portion 60.

The operation control portion 38 supplies the selection code data DSEC1, selection code data DSEC2, the selection signal SEL, the enabling signals SINA and SINB, and also the reading control signal SR to the register portions of respective color data selectively transmitting blocks 96, 98, 100, 102, 104, 106, 108 and 110 depending upon the writing control signal SW so as to make the color data selectively transmitting portion 60 to select respective color data. By this, the color data DCC1 to DCC4 are obtained and supplied to the multi-value/binary converting portion 62, and the color data DCC5 to DCC8 are obtained and supplied to the multi-value/binary converting portion 64.

The operation control portion 38 performs calculation for correcting fluctuation of ejection amount in each of individual printing head portions with respect to the color data DCC1, DCC2, DCC3 and DCC4. Also, the operation control portion 38 supplies respective density correction data DDH corresponding to respective color data to the density correcting portions 62a and 64a in the multi-value/binary converting portions 62 and 64, and supplies gamma table data DDG corresponded to respective color data to the output gamma converting portions 62b and 64b, in order to make correction for the corrected data so that output data having gray scale proportional to gray scale of the corrected data. By this, in the multi-value/binary converting portions 62 and 64, respective binarized data N1. N2, N3 and N4 are obtained per respective color data, and also the binarized data N5, N6, N7 and N8 are obtained. These binarized data are supplied to the binarized data selectively transmitting portion 66. In the binarized data selectively transmitting portion 66, any one of the binarized data N1, N2, N3, N4, N5, N6, N7 and N8, the code data DC3 and DCS3 is selected for supplying to the signal distribution processing portions 68 and 70. In the signal distribution processing portion 68, respective binarized data is divided into the one band binarized data to be supplied to the printing head portion 16 and one band binarized data to be supplied to the printing head portion 18 on the basis of 4 bit data among binarized data N1, N2, N3 and N4 or the code data DC3 or DCS3, and supplied to the registration adjusting portion 72. In the signal distribution processing portion 70, respective binarized data is divided into the one band binarized data to be supplied to the printing head portion 16 and one band binarized data to be supplied to the printing head portion 18 on the basis of 4 bit data among binarized data N5, N6, N7 and N8 or the code data DC3 or DCS3, and supplied to the registration adjusting portion 74.

The operation control portion 38 performs data array conversion for matching the arrangement of the binarized data from the signal distribution processing portions 68 and 70 to arrangement of the ejection openings, and supplies reading timing control signal on the basis of data indicative of the head gap HG and data indicative of registration adjusting value to the registration adjusting portions 72 and 74 for performing registration adjustment in the primary scanning direction and the auxiliary scanning direction by reading timing of the binarized data. By this, in the registration adjusting portion 72, respective color data FN1, BN1, FN2, BN2, FN3, BN3, FN4 and BN4 are read out and supplied to the drive control data selectively transmitting portion 76. On the other hand, registration adjustment is performed in the primary scanning direction and the auxiliary scanning direction. In the registration adjusting portion 72, respective color data FN5, BN5, FN6, BN6, FN7, BN7, FN8 and BN8 are read out and supplied to the drive control data selectively transmitting portion 76.

The operation control portion 38 supplies the writing control signal SW, selection signals SELPa, SELPb and enabling signals SINPa, SINPb to the register portions in the data selectively transmitting portions 116, 118, 120 and 122 for making the drive control data selectively transmitting portion 76 to perform selecting operation, and also supplies the reading control signal SR. By this, the drive control data FP1, FP2, FP3 and FP4, the drive control data FP5, FP6, FP7 and FP8, and the recording operation control data DF are supplied to the printing head drive control portions 16ka to 16kh. The drive control data BP1, BP2, BP3 and BP4, the drive control data BP5, BP6, BP7 and BP8 and the printing operation control data DB are supplied to the printing head drive control portions 18ka to 18kh.

On the other hand, the operation control portion 38 transmits the control data DC and DH to the carriage drive control portion 42 for drivingly controlling the carriage driving motor 44 and the transporting drive control portion 46 for drivingly controlling the transportation drive motor 48, at predetermined timing. By this, the carriage driving motor 44 is driven show shifting the printing head unit 10 to the predetermined position in opposition to the surface of the paper 4a. On the other hand, after printing operation of the printing head unit portion 10, the transporting driving motor 48 is driven to feed the paper 4a for a predetermined magnitude. Then, again the printing operation of the printing head 10 is performed to form the image on the basis of the image data DG on the surface of the paper 4a. Then, the paper, on which the image is formed, is transported to the paper cutting portion 8 and cut into the predetermined length by the paper cutting portion 8. The cut paper 6a is then stacked in the ejected paper stacker portion 6.

It should be noted that. in the foregoing embodiment, while the shown embodiment is constructed by providing the masking portions 52 and 54, the multi-value-binary converting portions 62 and 64, the signal distribution processing portions 68 and 70 and registration adjusting portions 72 and 74 are provided in the image processing portion 36, the present invention is not specified to the illustrated specific construction. For example, it is possible to provide respectively three masking portions, the pallet portions, the multi-value/binary converting portions, the signal distribution processing portions and the registration adjusting portions. Also, it is possible to provide more than or equal to nine printing head portions and more than or equal to nine colors of printing materials.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C. 70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An image forming apparatus comprising:
   an image data memory portion storing data representative of luminance component and chrominance component of an image per image array, per luminance component and chrominance component;
   an image memory control portion for making said image data memory portion to perform writing and reading operation of said data;
   an image processing portion including:
   a selection operation control portion for making said image memory control portion to selectively perform writing operation of said image data memory portion adapted to type of said data and reading operation of said image data memory portion depending in response to an output demand;
   a data selectively transmitting portion for selectively transmitting said data depending upon data type supplied from said image data memory portion;
   a masking portion performing a masking data process on the basis of an input data from said data selectively transmitting portion for obtaining a color data of different data type to that of said input data;
   a pallet converting portion for obtaining the color data with reference to a color conversion data table on the basis of the data from said data selectively transmitting portion;
   a color data selectively transmitting portion for selectively transmitting data representative of a color component from said data selectively transmitting portion, said color data from said masking portion and the color data from said pallet converting portion; and
   a binarization converting portion performing binarization process for the color data from said color data selectively transmitting portion;
   an image processing operation control portion for making said data selectively transmitting portion, said masking portion, said pallet converting portion, said color data selectively transmitting portion and said binarization converting portion to operate according to an operation program; and
   a printing head drive control portion for generating a drive control signal for making a printing head to perform image printing operation on the basis of said obtained through binarization process from said image processing portion.

2. An image forming apparatus as claimed in claim 1, wherein said data selectively transmitting portion selectively transmits a luminance data indicative of gray scale of respective of additive color mixing type colors, a luminance code data indicative of distribution of respective color on the basis of said luminance data, a color data indicative of respective of subtractive color mixing type colors, a color code data representative of distribution of respective colors on the basis of said color data, and a binarized data indicative of presence and absence of printing demand per each pixel data.

3. An image forming apparatus as claimed in claim 1, wherein said masking portion performs a making data process for luminance data representative of gray scale per each of additive color mixing type color and luminance code data representative of a distribution of a respective color on the basis of said luminance data.

4. An image forming apparatus as claimed in claim 3, wherein said masking portion includes a density converting portion and a plurality of masking calculation portion performing masking calculation process on the basis of the density data from said density converting portion.

5. An image forming apparatus as claimed in claim 4, wherein said color data from said masking calculation portion of said masking portion is supplied to said selector portion in said color data selectively transmitting block of said color data selectively transmitting portion.

6. An image forming apparatus as claimed in claim 4, wherein the data from said gate circuit portion in the selectively transmitting block of said data selectively transmitting portion is supplied to said density converting portion via said selector portion in said masking portion.

7. An image forming apparatus as claimed in claim 1, wherein said pallet converting portion derives the color data with reference to a color conversion data on the basis of color code data indicative of a distribution of respective color on the basis of said color data.

8. An image forming apparatus as claimed in claim 1, wherein said data selectively transmitting portion comprises a plurality of selectively transmitting blocks each having a plurality of gate circuit portions, to which data is input, and a decoder portion performing operation control of said gate circuit portion.

9. An image forming apparatus as claimed in claim 8, wherein the data from said gate circuit portion in the selectively transmitting blocks of said data selectively transmitting portion is supplied to said density converting portion via said selector portion in said masking portion.

10. An image forming apparatus as claimed in claim 1, wherein said color data selectively transmitting portion includes a plurality of color data selectively transmitting blocks having a plurality of selector portion selectively transmitting supplied color data and a decoder portion performing operation control of said selector portion.

11. An image forming apparatus as claimed in claim 10, wherein said color data from said selector portion in said color data selectively transmitting block of said color data selectively transmitting portion is supplied to said binarization processing portion via said density correcting portion and an output gamma converting portion in said binarization converting portion.

12. An image forming apparatus as claimed in claim 10, wherein said color data from said masking calculation portion of said masking portion is supplied to said selector portion in said color data selectively transmitting block of said color data selectively transmitting portion.

13. An image forming apparatus comprising:
   an image data memory portion storing image data which corresponds to respective ones of a plurality of components including a plurality of luminance components and chrominance components, said image data memory portion storing the image data per each component;
   a data selectively outputting portion for selectively outputting the image data stored in said image data memory portion depending upon the component of the image data;
   a masking portion performing a masking data process on a basis of an input data for obtaining a color data of a different data type to that of the image data;
   a pallet converting portion for obtaining the color data with reference to a color conversion data table on a basis of the image data;
   a binarization converting portion performing a binarization process for the color data; and
   an image processing operation control portion for making said masking portion, said pallet converting portion, and said binarization converting portion to operate depending upon the data type of the image data,
   wherein said data selectively outputting portion permits to selectively output the image data to said masking portion, said pallet converting portion, or said binarization converting portion, depending upon the luminance component and the chrominance component.

14. An image forming apparatus as claimed in claim 13, wherein there are provided a plurality of printing heads.

15. An image forming apparatus as claimed in claim 14 wherein each of said printing heads is an ink-jet printing head.

16. An image forming apparatus as claimed in claim 15 wherein each of said ink-jet printing heads ejects ink using thermal energy.

17. An image forming apparatus as claimed in claim 13, wherein said image data memory portion further stores a code data, and said data selectively outputting portion selectively outputs image data, depending upon whether the image data is the predetermined chrominance component data or the code data.

18. An image forming apparatus for forming an image using a plurality of recording heads which correspond to different colors, respectively, said apparatus comprising:
   an input portion where image data is input, said input portion enabling to input a plurality of data types of image data, one of the plurality of data types being any one of data representative of a luminance component, data representative of a chrominance component, and a code data;
   an image data memory for storing the input image data; and
   an image processing portion having a plurality of processing portions which correspond to at least a masking data process and a binarization process for performing image processing of the image data stored in said image data memory, generating recording signals which correspond to respective ones of different colors to be recorded by said plurality of recording heads, and performing image processing by selectively using said plurality of processing portions, depending upon each of the data types of the image data.

19. An image forming apparatus as claimed in claim 18, wherein a plurality of the data types comprise a data of additive color mixing type colors, and a data of subtractive color mixing type colors.

20. An image forming apparatus as claimed in claim 18, wherein said colors to be recorded by said plurality of recording heads are arbitrarily changeable or increased/decreased, and said image processing portion performs image processing depending upon each of said data types of image data and said colors to be recorded by said plurality of recording heads.

21. An image forming apparatus as claimed in claim 18, wherein there are provided a plurality of printing heads.

22. An image forming apparatus as claimed in claim 21, wherein each of said printing heads is an ink-jet printing head.

23. An image forming apparatus as claimed in claim 22, wherein each of the ink-jet printing heads ejects ink using thermal energy.

* * * * *

UNITED STATES PATENT AND TRADEMARK OFFICE
CERTIFICATE OF CORRECTION

PATENT NO. : 6,115,138
DATED : September 5, 2000
INVENTOR(S) : Toshiyuki Yanaka

It is certified that error appears in the above-identified patent and that said Letters Patent is hereby corrected as shown below:

Item [57] ABSTRACT
Line 3, "substractive" should read -- subtractive --.

Figure 1B:
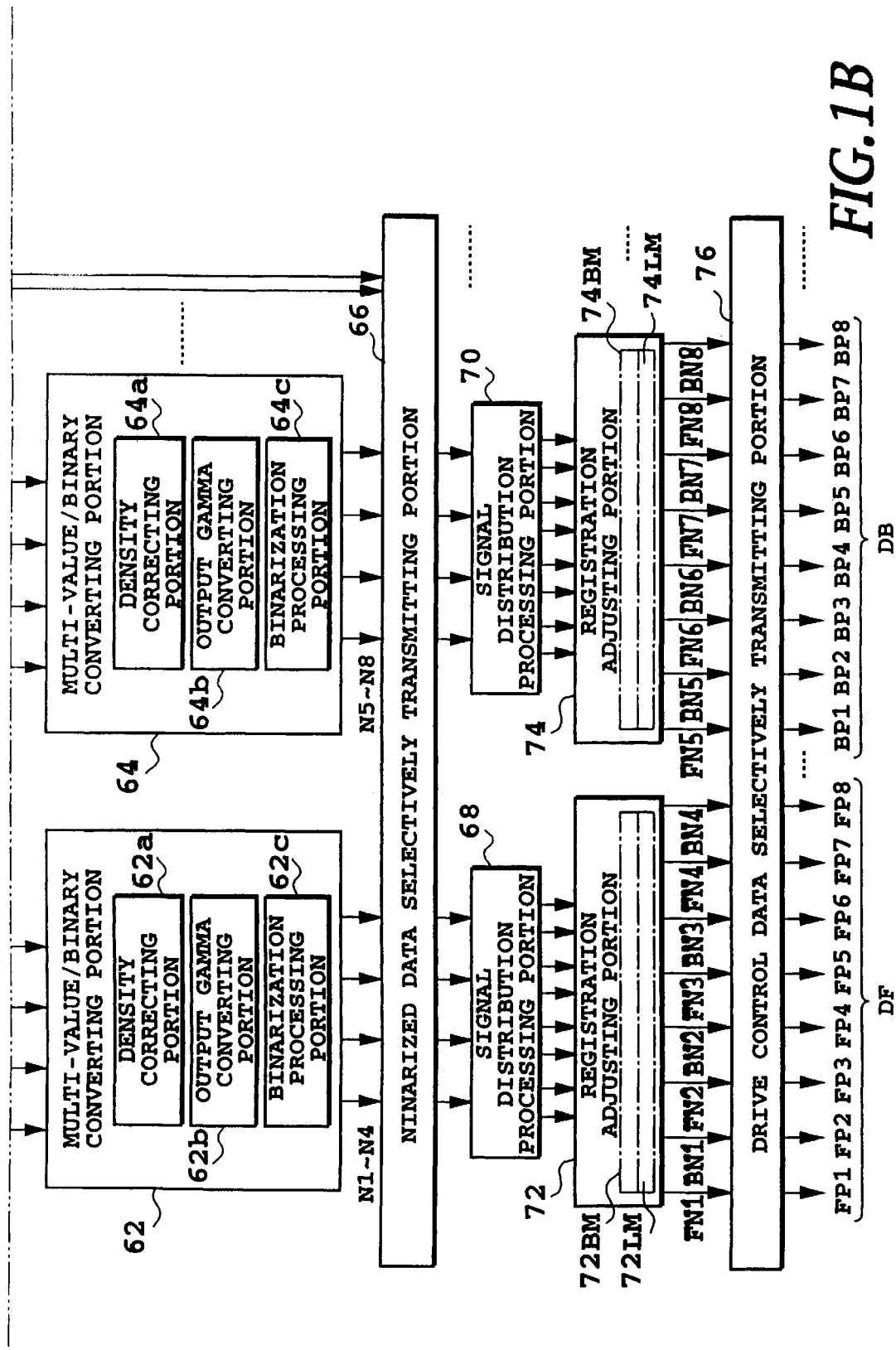
FIG. 1 is a block diagram showing an image processing portion together with a storage portion in one embodiment of an image forming apparatus according to the present invention.

Sheet 2,
Figure 1B, "NINARIZED" should read -- BINARIZED --.

Sheet 9,
Figure 7, "DEGISTER" should read --REGISTER--.

Column 1,
Line 7, "medium" should read -- medium on --;
Line 11, "a" should be deleted;
Line 14, "a" should read -- an --;
Line 17, "rearing" should read -- reading --;
Line 19, "gray" should read -- a gray --;
Line 20, "and" should read -- and a --;
Line 27, "opposing" should read -- opposite --;
Line 43, "binarization" should read -- a binarization -- and "gray" should read -- a gray --;
Line 46, "performing" should read -- performing a --;
Line 50, "By this," should read -- Accordingly, --;
Line 63, "special" should read -- a special --;
Line 64, "the" should read -- an --;
Line 65, "special" should read -- a special --.

Column 2,
Line 1, "tone" should read -- the tone --;
Line 5, "decrease" should read -- decrease the --;
Line 17, "of" should read -- of a -- and "and" should read -- and a --;
Line 21, "to perform" should read -- perform a --;
Line 23, "data;" should read -- data; and --;
Line 26, "to" should be deleted and "perform" should read -- perform the --;
Line 27, "portion" should read -- portions --;
Line 28, "to" should read -- to the --;
Line 47, "binariza-" should read -- a binariza ---;
Line 62, "of" (second occurrence) should be deleted;
Line 64, "of" (second occurrence) should read -- of a --;
Line 66, "respective" should read -- respective ones --;
Line 67, "of" (first occurrence) should read -- of a --.

UNITED STATES PATENT AND TRADEMARK OFFICE
CERTIFICATE OF CORRECTION

PATENT NO.   : 6,115,138
DATED        : September 5, 2000
INVENTOR(S)  : Toshiyuki Yanaka It is certified that error appears in the above-identified patent and that said Letters Patent is hereby corrected as shown below:

Column 3,
Line 11, "of distribution" (second occurrence) should be deleted;
Line 12, "color" (first occurrence) should read -- colors --;
Line 15, "and" should read -- and a --;
Line 17, "portion" should read -- portion. --;
Line 19, "portion" (second occurrence) should read -- portions --;
Line 24, "portion" should read -- portions --;
Line 44, "of" should read -- of a --;
Line 60, "can be" should read -- is --;
Line 63, "perform" should read -- perform an --;
Line 65, "luminance" should read -- a luminance --;
Line 67, "In" (first occurrence) should read -- in --.

Column 4,
Line 12, "By this," should read -- Accordngly, --;
Line 44, "-ing" should read -- ing a --.

Column 5,
Line 6, "other" should read -- another --;
Line 7, "in detail" should be deleted; --;
Line 8, "obscure" should read -- obscuring --;
Line 19, "performing" should read -- performing a --;
Line 59, "has" should read -- have --.

Column 6,
Line 7, "are corresponded" should read -- correspond --;
Line 14, "arranged" should read -- arranged in --;
Line 21, "socalled" should read -- so-called --;
Line 25, "number" should read -- the number --;
Line 29, "By this," should read -- Accordingly, --;
Line 44, "supplied" should read -- supplied with --.

Column 7,
Line 12, "type." should read -- types. --;
Line 61, "portion" should read -- portions --;
Line 67, "is" should read -- is an --.

UNITED STATES PATENT AND TRADEMARK OFFICE
CERTIFICATE OF CORRECTION

PATENT NO.   : 6,115,138
DATED        : September 5, 2000
INVENTOR(S)  : Toshiyuki Yanaka It is certified that error appears in the above-identified patent and that said Letters Patent is hereby corrected as shown below:

Column 8,
Line 4, "portion" should read -- portions --;
Line 4, "stores" should read -- store --;
Line 9, "one" should be deleted;
Line 11, "in" should read -- is the --;
Line 12, "portion 30i are" should read -- portions 30i --;
Line 23, "By" should be deleted;
Line 24, "this," should read -- Accordingly, --;
Line 28, "By this," should read -- Accordingly, --;
Line 29, "portion" should read -- portions --;
Line 32, "portions" should read -- portion --;
Line 39, "portion" should read -- portions --.

Column 9,
Line 17, "portion 80R." should read -- portion 80R are also included. --;
Line 18, "of the" should be deleted and "portion" should read -- portions --;
Line 20, "portion" should read -- portions --;
Line 27, "enabling" should read -- enables --;
Line 36, "By this," should read -- Accordingly, --;
Line 45, "By" should be deleted;--;
Line 46, "this," should read -- Accordingly, --;
Line 55, "By this," should read -- Accordingly, --;
Line 65, "By" should be deleted;
Line 66, "this," should read -- Accordingly, --.

Column 10
Line 7, "By" should be deleted;
Line 8, "this," should read -- Accordingly, --;
Line 28, "By this," should read -- Accordingly, --.

Column 11,
Line 16, "respective" should read -- respective ones --;
Line 22, "respective" should read -- respective ones --;
Line 28, "respective" should read -- respective ones --;
Line 62, "By these," should read -- Accordingly, --;
Line 63, "performs calculation" should read -- perform calculations --;
Line 67, "having" should read -- having a --.

UNITED STATES PATENT AND TRADEMARK OFFICE
CERTIFICATE OF CORRECTION

PATENT NO. : 6,115,138
DATED : September 5, 2000
INVENTOR(S) : Toshiyuki Yanaka

It is certified that error appears in the above-identified patent and that said Letters Patent is hereby corrected as shown below:

Column 12,
Line 3, "bites" should read -- bits --;
Line 8, "represent" should read -- represents --;
Line 14, "By this," should read -- Accordingly, --;
Line 30, "By this," should read -- Accordingly, --;
Line 32, "performs calculation" should read -- perform calculations --;
Line 40, "bite" should read -- bit --;
Line 52, "By this," should read -- Accordingly, --;
Line 53, "obtains" should read -- obtain --.

Column 13,
Line 6, "block" should read -- blocks --;
Line 19, "to" (second occurrence) should be deleted;
Line 24, "to" should be deleted;
Line 44, "By" should be deleted;
Line 45, "this," should read -- Accordingly, --;
Line 50, "By" should be deleted;
Line 51, "this," should read -- Accordingly, --.

Column 14,
Line 10, "heads" should read -- head --;
Line 25, "is consisted" should read -- consists --;
Line 28, "(bites)" should read -- (bytes) --;
Line 37, "respective" should read -- respective ones --;
Line 38, "image" should read -- image data --;
Line 54, "coot," should read -- color, --;
Line 56, "bina-" should read -- a bina --;
Line 57, "respective" should read -- respective ones --.

Column 15,
Line 61, "performs" should read -- perform --.

Column 16,
Line 12, "date" should read -- data --;
Line 25, "respective" should read -- respective ones --;
Line 32, "bigger" should read -- buffer --;
Line 36, "respective" should read -- respective ones --;
Line 39, "By this," should read -- Accordingly, --;
Line 45, "to adjust" should read -- adjusts --.

UNITED STATES PATENT AND TRADEMARK OFFICE
CERTIFICATE OF CORRECTION

PATENT NO. : 6,115,138
DATED : September 5, 2000
INVENTOR(S) : Toshiyuki Yanaka

It is certified that error appears in the above-identified patent and that said Letters Patent is hereby corrected as shown below:

Column 17,
Line 27, "constriction" should read -- construction --;
Line 47, "signal" should read -- signals --;
Line 61, "constriction" should read -- construction --.

Column 18,
Line 16, "perform" should read -- performs --;
Line 19, "actuates" should read -- actuates a --;
Line 26, "By this," should read -- Accordingly, --;
Line 27, "display" should read -- a display --;
Line 46, "stores" should read -- stores the --;
Line 47, "portion" should read -- portions --;
Line 57, "By" should be deleted --;

Column 19,
Line 2, "with" should read -- with a --;
Line 24, "By this," should read -- Accordingly, --;
Line 42, "By this," should read -- Accordingly, -- and "respective" should read -- respective ones --;
Line 58, "By this," should read -- Accordingly, -- and "respective" should read -- respective ones --;
Line 60, "DS4." should read -- DS4 are produced --;
Line 65, "By this," should read -- Accordingly, --.

Column 20,
Line 4, "type" should read -- types --;
Line 18, "calculation" should read -- calculations --;
Line 27, "corresponded" should read -- corresponding --;
Line 29, "correction" should read -- corrections --;
Line 31, "By this," should read -- Accordingly, --;
Line 32, "data N1." should read -- data N1, --;
Line 63, "By this," should read -- Accordingly --.

Column 21,
Line 11, "to" should be deleted;
Line 12, "By this," should read -- Accordingly, --;
Line 25, "By this," should read -- Accordingly, --;
Line 26, "show" should read -- for --;
Line 38, "that." should read -- that, --.

UNITED STATES PATENT AND TRADEMARK OFFICE
CERTIFICATE OF CORRECTION

PATENT NO. : 6,115,138
DATED : September 5, 2000
INVENTOR(S) : Toshiyuki Yanaka

It is certified that error appears in the above-identified patent and that said Letters Patent is hereby corrected as shown below:

Column 22,
Line 22, "to" should read -- in --;
Line 27, "Laying-open" should read -- Laid-open --;
Line 40, "consists" should read -- consist --.

Column 23,
Line 10, "liquid" should read -- liquefied --;
Line 15, "30°C. 70°C." should read --30°C.-70°C. --;
Line 31, "Laying-open" should read -- Laid-open --.

Column 24,
Line 13, "and" should be deleted;
Line 25, "to" should be deleted;
Line 26, "obtained" should read -- obtained data --;
Line 32, "of" should be deleted;
Line 35, "of" should be deleted;
Line 41, "making" should read -- masking --;
Line 48, "portion" (second occurrence) should read -- portions --.

Column 25,
Line 13, "portion" should read -- portions --.

Column 26,
Line 3, "claim 14" should read -- claim 14, --;
Line 5, "claim 15" should read -- claim 15, --.

Signed and Sealed this

Eighteenth Day of December, 2001

*Attest:*

JAMES E. ROGAN
*Attesting Officer*  *Director of the United States Patent and Trademark Office*